(12) United States Patent
Appel

(10) Patent No.: US 10,584,694 B2
(45) Date of Patent: Mar. 10, 2020

(54) MINIATURE DIAPHRAGM PUMP WITH ENLARGED OPERATION TIME

(71) Applicant: ORIDION MEDICAL 1987 LTD., Jerusalem (IL)

(72) Inventor: Yosef Appel, Male Adumim (IL)

(73) Assignee: ORIDION MEDICAL 1987 LTD., Jerusalem (IL)

( * ) Notice: Subject to any disclaimer, the term of this patent is extended or adjusted under 35 U.S.C. 154(b) by 661 days.

(21) Appl. No.: 15/019,468

(22) Filed: Feb. 9, 2016

(65) Prior Publication Data

US 2017/0226996 A1 Aug. 10, 2017

(51) Int. Cl.
*F04B 43/04* (2006.01)
*F04B 45/047* (2006.01)
*H02K 7/075* (2006.01)
*F04B 17/03* (2006.01)
*F04B 35/04* (2006.01)
*F04B 43/02* (2006.01)
*H02K 7/08* (2006.01)

(52) U.S. Cl.
CPC .............. *F04B 43/04* (2013.01); *F04B 17/03* (2013.01); *F04B 35/04* (2013.01); *F04B 43/02* (2013.01); *F04B 45/047* (2013.01); *H02K 7/075* (2013.01); *H02K 7/083* (2013.01)

(58) Field of Classification Search
CPC .......... F04B 17/03; F04B 35/04; F04B 43/04; F04B 43/02; F04B 43/00; F04B 45/047; H02K 7/075; H02K 7/083
See application file for complete search history.

(56) References Cited

U.S. PATENT DOCUMENTS

| | | | | |
|---|---|---|---|---|
| 1,066,635 A * | 7/1913 | Macdonald | ........... | A61M 1/101 310/112 |
| 1,973,070 A * | 9/1934 | Hess | ..................... | F04D 13/064 310/112 |
| 2,698,394 A * | 12/1954 | Brown | .................... | F16H 21/50 290/1 R |
| 2,940,661 A * | 6/1960 | Lorenz | .................. | F04C 18/126 417/338 |

(Continued)

FOREIGN PATENT DOCUMENTS

| DE | 102013003513 A1 * | 9/2014 | ............... F04B 35/04 |
|---|---|---|---|
| EP | 2194270 B1 * | 6/2013 | ................. F04B 7/00 |

OTHER PUBLICATIONS

Machine Translation of DE 102013003513.*
Machine Translation of DE 102010051262.*

*Primary Examiner* — Christopher S Bobish
(74) *Attorney, Agent, or Firm* — Cantor Colburn LLP

(57) ABSTRACT

A diaphragm pump configuration may include an eccentric drive assembly that is configured to be actuated by a motor shaft of a motor including an external magnetic rotor and an inner electrical stator that is contained in the external magnetic rotor. Two bearings may rotatably support the motor's drive shaft such that one bearing is positioned on one side of the eccentric drive assembly, and the other bearing is positioned on the other side of the eccentric drive assembly. The diaphragm pump configuration decreases considerably the workload on the bearing nearest to eccentric drive assembly, and significantly increases the operation time of the diaphragm pump.

22 Claims, 12 Drawing Sheets

(56) References Cited

U.S. PATENT DOCUMENTS

| | | | | |
|---|---|---|---|---|
| 3,049,284 A * | 8/1962 | Alamprese | F04B 45/00 | 417/284 |
| 3,487,657 A * | 1/1970 | Teegraden | F04B 35/04 | 310/112 |
| 4,248,050 A * | 2/1981 | Durenec | F04B 3/003 | 417/415 |
| 5,164,622 A * | 11/1992 | Kordik | H02K 3/28 | 310/156.26 |
| 5,497,040 A * | 3/1996 | Sato | H02K 1/187 | 310/67 R |
| 5,898,988 A * | 5/1999 | Horski | H02K 1/187 | 29/596 |
| 5,957,667 A * | 9/1999 | Epp | F04B 37/18 | 417/271 |
| 6,166,470 A * | 12/2000 | Miyazawa | H02K 1/145 | 310/181 |
| 6,609,899 B1 * | 8/2003 | Finnamore | F04B 27/0404 | 384/585 |
| 6,624,540 B2 * | 9/2003 | Fukuda | H02K 5/00 | 206/701 |
| 6,707,224 B1 * | 3/2004 | Petersen | H02K 1/02 | 310/254.1 |
| 6,762,521 B2 * | 7/2004 | Peter | H02K 1/187 | 310/43 |
| 7,019,423 B1 * | 3/2006 | Horng | G11B 19/2009 | 310/51 |
| 7,064,468 B2 * | 6/2006 | Fujinaka | H02K 1/146 | 310/156.45 |
| 7,732,956 B2 * | 6/2010 | Mochida | H02K 1/2786 | 310/67 R |
| 7,911,092 B2 * | 3/2011 | Kim | G11B 19/2018 | 310/156.26 |
| 8,030,868 B2 * | 10/2011 | Yamagishi | E01H 5/04 | 310/114 |
| 8,201,393 B2 * | 6/2012 | Zapf | F01N 3/2066 | 60/286 |
| 8,959,895 B2 * | 2/2015 | Zapf | F01N 3/2066 | 60/286 |
| 9,453,507 B2 * | 9/2016 | Ghodsi-Kameneh | F01C 21/08 | |
| 2001/0048251 A1 * | 12/2001 | Ieoka | F04C 29/0085 | 310/49.01 |
| 2004/0245869 A1 * | 12/2004 | Dooley | F01D 15/10 | 310/68 C |
| 2007/0041847 A1 * | 2/2007 | Inoue | F04B 35/04 | 417/269 |
| 2007/0090704 A1 * | 4/2007 | Chen | F04D 13/0673 | 310/86 |
| 2007/0110595 A1 * | 5/2007 | Sato | F04D 1/006 | 417/351 |
| 2007/0114861 A1 * | 5/2007 | Bott | B65G 13/075 | 310/71 |
| 2010/0135825 A1 * | 6/2010 | Walth | F04B 35/045 | 417/44.1 |
| 2010/0158712 A1 * | 6/2010 | Hartl | F04B 27/0404 | 417/321 |
| 2010/0225260 A1 * | 9/2010 | Gerfast | H02K 29/03 | 318/400.11 |
| 2012/0321485 A1 * | 12/2012 | Proietti De Marchis | F04B 13/00 | 417/44.1 |
| 2013/0294939 A1 * | 11/2013 | Gilarranz | F04D 17/12 | 417/53 |
| 2013/0328439 A1 * | 12/2013 | Okada | F04B 35/04 | 310/216.117 |
| 2015/0110642 A1 * | 4/2015 | Dahouk | F04D 13/068 | 417/16 |
| 2015/0244293 A1 * | 8/2015 | Pieder | H02P 5/747 | 310/112 |
| 2015/0275891 A1 * | 10/2015 | Chong | F04B 53/006 | 417/53 |
| 2017/0047833 A1 * | 2/2017 | Ikeuchi | H02K 21/12 | |
| 2017/0233925 A1 * | 8/2017 | Fukui | H02K 51/00 | 68/140 |
| 2018/0106244 A1 * | 4/2018 | Wang | F04B 9/04 | |

\* cited by examiner

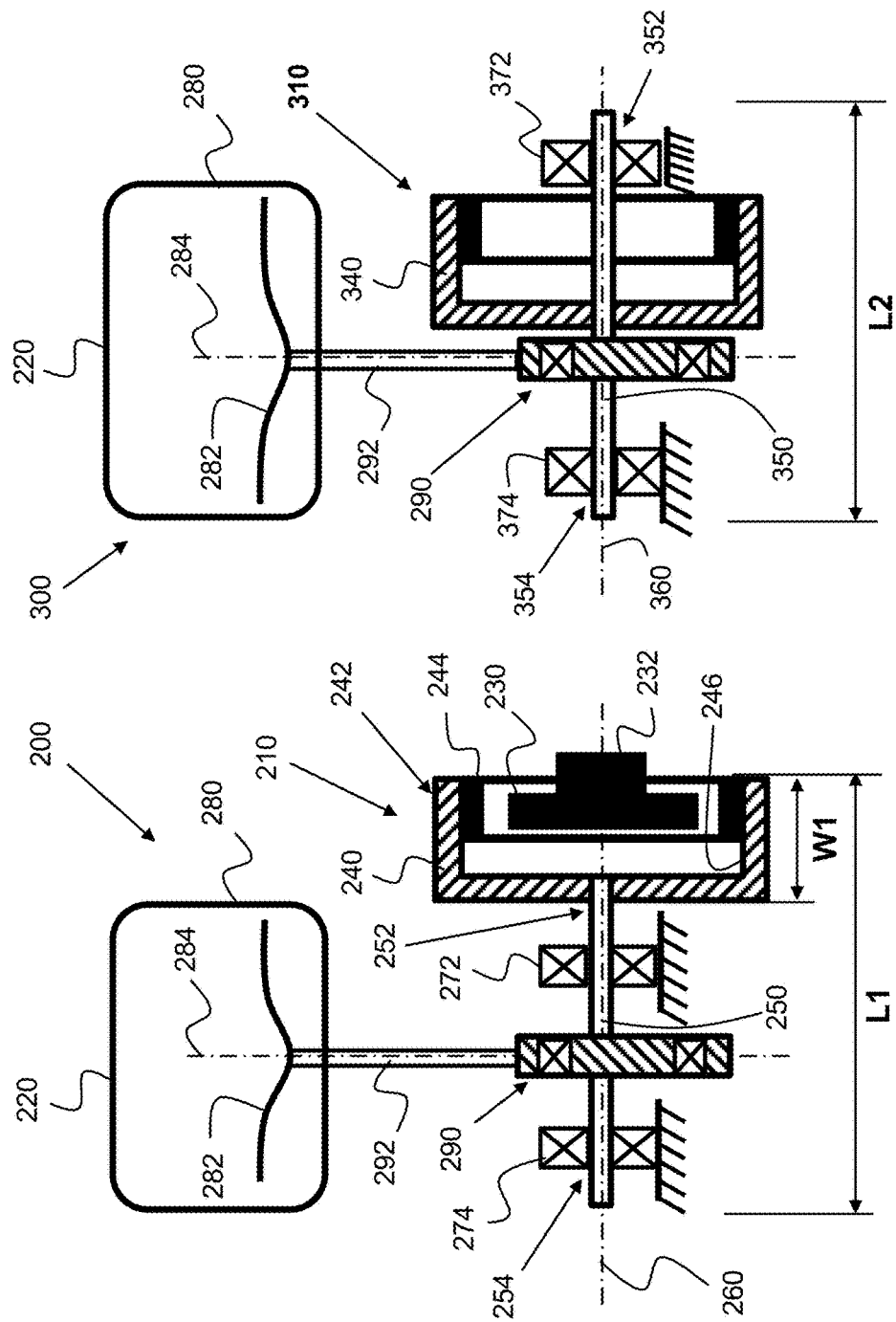

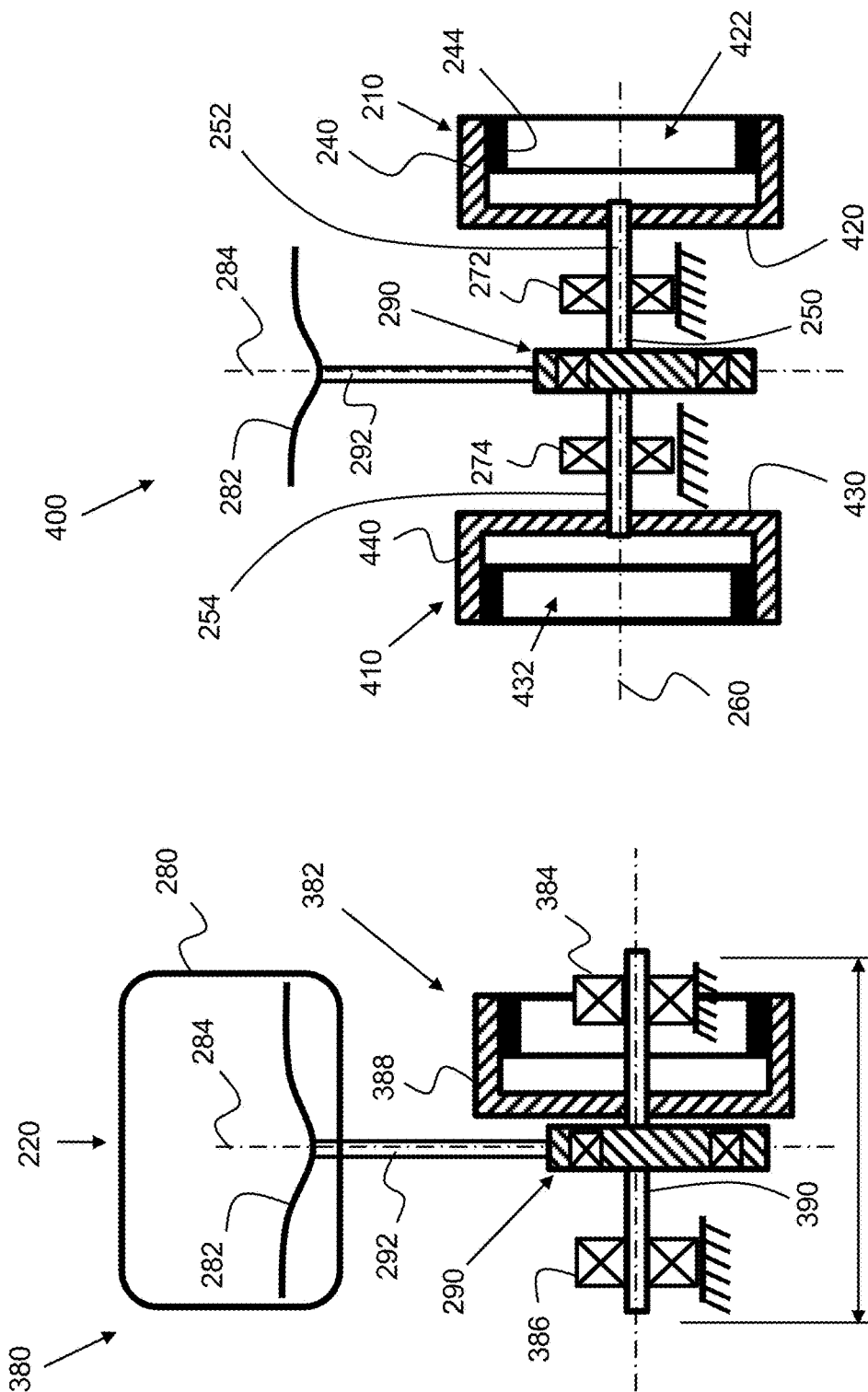

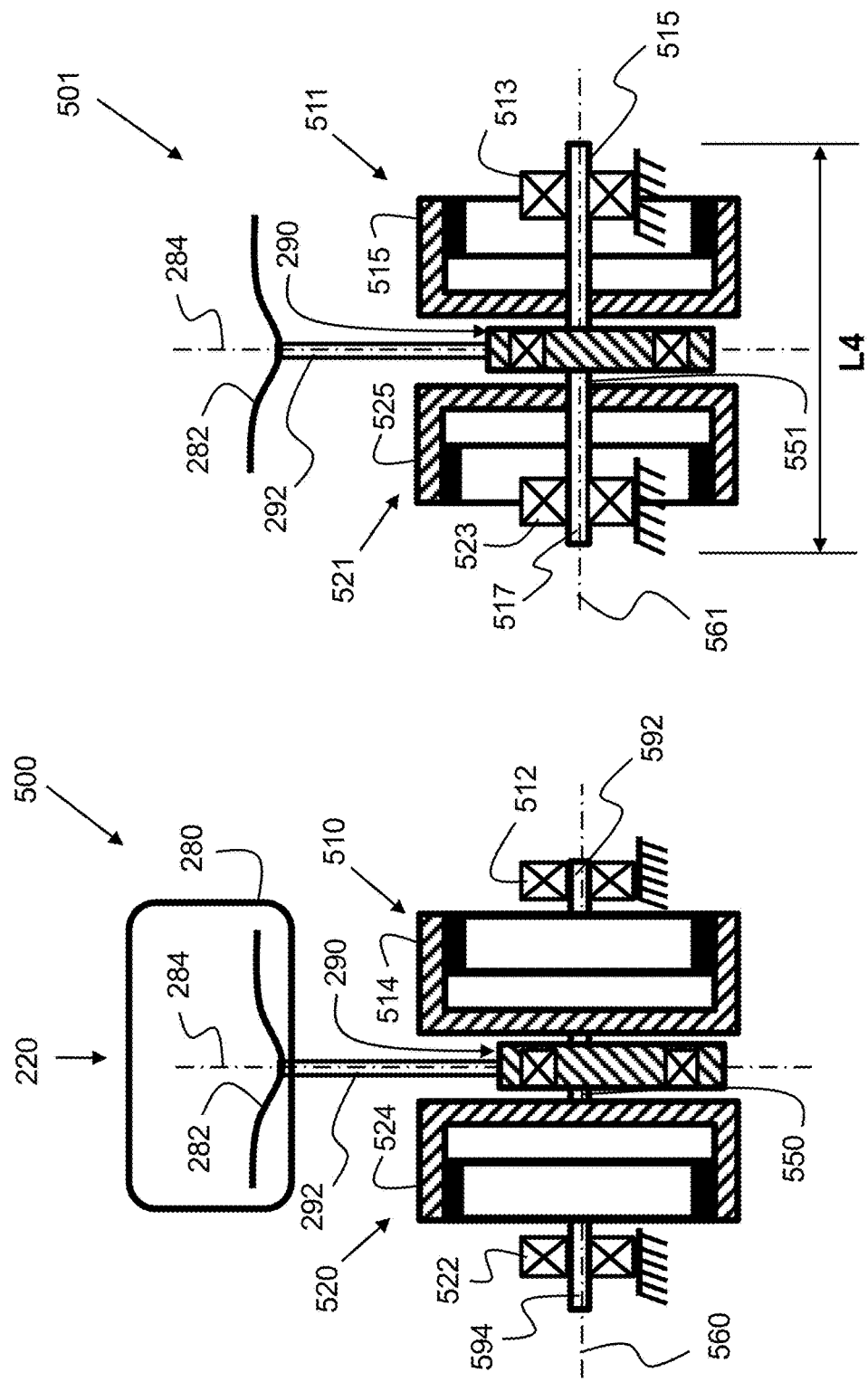

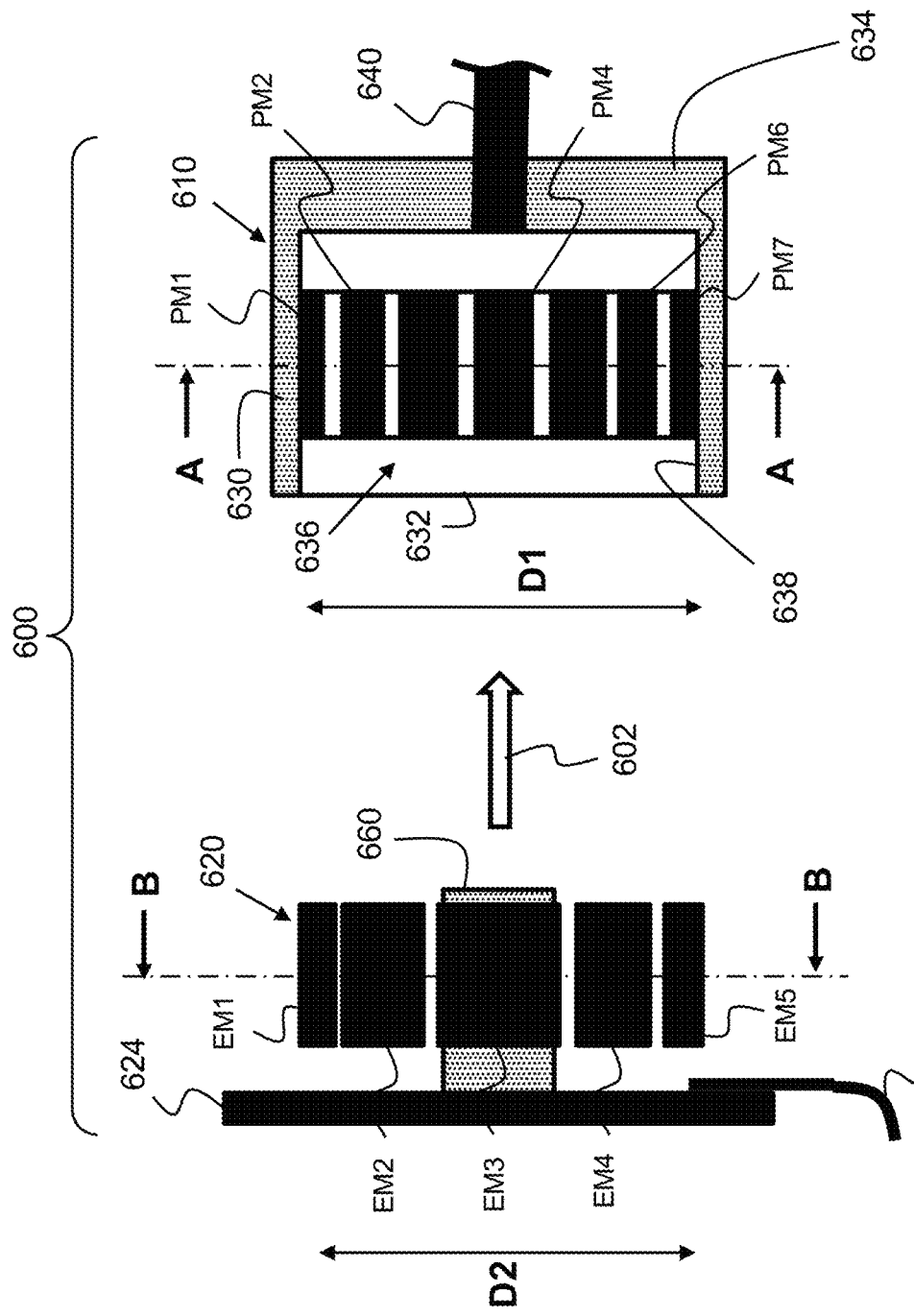

MINIATURE DIAPHRAGM PUMP WITH ENLARGED OPERATION TIME

FIELD OF THE INVENTION

The present invention relates to a coupling-free diaphragm pump assembly including an electric motor as driving means.

BACKGROUND

Diaphragm pumps are used extensively, for example, in the field of health care and medicine to transfer gases or fluids of various types. In some cases, the applications or systems require that the gas(es) volume flow rate (Q) in such pumps be relatively 'low' (e.g., in the order of about 50 mL/min, at a relative vacuum of about 100 mBar. In many cases, medical (and other miniature) pumps are designed to take samples of, for example, gases for measurement, and such medical pumps typically use small diaphragm pumps in order to produce effective and stable operating conditions. An eccentric drive mechanism is often used to actuate diaphragm pumps.

FIG. 1A shows a principle of a diaphragm pump 100 with eccentric drive mechanism 102. An eccentric shaft 2 inside a bearing 5 (e.g., ball bearing), which is actuated by a drive shaft 4 of an electric motor, displaces a connecting (push) rod (pump shaft 3) in an upward and downward movement (or 'back-and-forth' movement). In turn, pump shaft 3 moves a diaphragm 1 inside a pumping chamber 104. By means of the eccentric shaft 2, pump shaft 3 is set into swinging (6) and tilting motion. Eccentric drive mechanism 102 enables the conversion of the moment of rotation of drive shaft 4 into relatively high forces on the upward and downward motion of pump shaft 3. As such, diaphragm pumps with eccentric drives are well suited for producing relatively high pressures within the limits of the load-carrying capacity of the diaphragm material. Another significant advantage of the eccentric drive is that pumps can be operated in every mounting orientation, which facilitates flexibility in the design of pumping systems.

FIG. 1B schematically illustrates a typical diaphragm pump 106 that implements the 'pumping' principle described in connection with FIG. 1A. Typically, a motor's cantilever drive shaft 110, which actuates a pump shaft 120, is mechanically supported by and between two bearings (130,140)—one bearing on each side of a rotor 152 of electric motor 150—in order to mechanically support and stabilize rotor 152 by supporting/stabilizing its drive shaft 110. In this configuration, bearing 140 is structurally interposed between rotor 152 and the diaphragm pump's eccentric drive mechanism 160, while bearing 130 is positioned away from eccentric drive mechanism 160, on the other side of rotor 152. (That is, both bearings 130 and 140 are structurally positioned on the same side of rotor's drive shaft 110 with respect, or relative, to eccentric drive mechanism 160.)

Drive shaft 110 is a cantilever shaft, meaning that it has a free end 170. (Free end 170 is not supported by a bearing; i.e., end 170 is 'bearing-free'.) This means that the motor's drive shaft portion (L0) extending from bearing 140 to eccentric drive mechanism 160 has some degree of freedom ("DOF"). Having a DOF at the 'pump side' of the drive shaft is problematic because when drive shaft 110 rotates, it moves pump shaft 120 in a swinging movement (e.g., swinging movement 6, FIG. 1A) that, in turn, applies a counter force on drive shaft 110 at that point. In other words, the swinging movement of pump shaft 120 generates a moment on shaft portion L0 that acts or tends to bend portion L0 of drive shaft 110 and, thus, to transfer a moment to bearing 140. The moment, whose magnitude is a function of the mechanical force 180 that pump shaft 120 applies to shaft end 170 and the shaft length (L0), applies a radial mechanical force on bearing 140. (The mechanical radial force is radially applied from the bearing's center outward.) Consequently, bearing 140, which has to counteract the rotating radial force, wears out relatively fast (e.g., in less than the avowed 20,000 hours in the case of 'micro-pump' systems), thus reducing the pump's overall operation time. Attempts to overcome the bearing wearing problem included making the bearing robust or adding bearings to the diaphragm pump, in a way that made the diaphragm pump, as a whole, more robust. These solutions suffer from at least two drawbacks: (1) the capacity of the robust diaphragm pump cannot be reduced to useful low levels, and (2) such diaphragm pumps consume additional electrical power due to the additional weight and friction of the robust bearing(s).

FIG. 1C illustrates distribution of forces acting on motor's bearings during operation of a diaphragm pump. Fo is a force applied by the diaphragm's push rod (rod 3 in FIG. 1A; rod 120 in FIG. 1B) on free end 170 of cantilever shaft 110. $R_1$ and $R_2$ are counteracting forces acting at the bearing nearest to the diaphragm (at location 103) and at the remote bearing (at location 105). Since end 170 of cantilever shaft 110 is not supported by a bearing, it is free to move laterally and exert detrimental (e.g., 'grinding') radial forces on the two bearings, as described above. The detrimental radial forces acting on the two bearings depend, among other things, on the values of Fo, $R_1$, $R_2$, Lo and L, as described below. Equations (1) and (2) apply at equilibrium (static state) of the pump:

$$F_0 * L_0 = L * R_2 \tag{1}$$

$$R_1 = F_0 + R_2 \tag{2}$$

Ratios $R_1/F_0$ and $R_2/F_0$ can be found from equations (1) and (2):

$$R_1/F_0 = (L+L_0)/L = (1+L_0/L) \tag{3}$$

$$R_2/F_0 = L_0/L \tag{4}$$

Assuming that $L_0/L \sim 0.5$, $R_1$ and $R_2$ can be found using equations (3) and (4), as follow:

$$R_1 = 1.5 F_0;\ R_2 = 0.5 F_0 \tag{5}$$

Equation (5) shows that the force ($R_1$) acting on the bearing at 103 (the bearing at the pump side) is three times greater than the force ($R_2$) that acts on the remote bearing. The conventional configuration of diaphragm pump, therefore, makes the bearing at the pump side vulnerable to damage and wear. (A comparative analysis of the forces playing a role in the diaphragm pump subject of the present invention is described in connection with FIG. 9.)

SUMMARY

It would, therefore, be beneficial to provide a miniature diaphragm pump that has a prolonged operating time relative to conventional diaphragm pumps, operate at relatively very low, yet useful, capacities, consumes low electrical power, and is compact/miniature.

A coupling-free diaphragm pump may include a first electric motor that may include an inner stator and an external rotor. The external rotor may concentrically house or contain the inner stator. The first electric motor may include a rotor shaft having a first end (distal end) connected to the external rotor, and a second end that is opposite the first end. The rotor shaft may be configured to be driven by the external rotor to rotate about a motor axis, which may be common to, or coincide with, a longitudinal axis of the rotor shaft, a longitudinal axis of the inner stator and a longitudinal axis of the external rotor. The external rotor may be made of metallic material, which may be magnetic or, preferably, non-magnetic, or of plastic material(s). The preferable non-magnetic metal, which may have high density in order to increase the rotor's rotational inertia and maintain uniform rotation, may be selected from a group consisting of stainless steel, bronze and brass. The preferable plastic material (e.g., high temperature polymers) used for the external rotor may be selected from a group consisting of: Polyoxymethylene (sold under brand names Delrin, Celcon, Ramtal, Duracon, Kepital and Hostaform), Polyvinylidene fluoride (PVDF) (sold under brand names KF (Kureha), Hylar (Solvay), Kynar (Arkema) and Solef (Solvay), Polyether ether ketone (PEEK) and Polypropylene.

The diaphragm pump may also include a first bearing (a distal bearing) to rotatably support the first end of the rotor shaft, which is the shaft's end connected to the external rotor, and a second bearing (a proximal bearing) to rotatably support the second end of the rotor shaft.

The diaphragm pump may also include a diaphragm pump assembly that is interposed between the first bearing and the second bearing. The diaphragm pump assembly may include a pumping chamber including a diaphragm, and an eccentric drive assembly that may be reciprocally actuated by the rotor shaft to, thereby, drive/move the diaphragm along a pump driving axis of the pumping chamber.

The external rotor may include a cylindrical part, which may be or include a magnetic metal, or a non-magnetic metal or a plastic material (with the non-magnetic metal and plastic material being the preferable materials), and a number N1 of permanent magnets that may be attached to, or embedded in, the non-magnetic cylindrical part. The N1 permanent magnets (e.g., N1=12) may be angularly uniformly distributed, or evenly spaced apart in, or with respect to the, for example, circumference of the non-magnetic cylindrical part of the external rotor. The diaphragm pump, or the external rotor, may include a non-magnetic ring shaped member having a ring axis. The non-magnetic ring shaped member may house, embed or contain the N1 permanent magnets. The value of N1 may be a multiple of 3 (e.g., 3, 6, 9, 12, 15 and so on, with a motor's diameter of, for example, 10-15 millimeters. (Preferably N1=12.) The ring shaped member may be concentrically attached or affixed to an inner surface of the non-magnetic cylindrical part such that the longitudinal axis of the ring shaped member and the motor axis coincide.

The internal stator may include a number M1 of electromagnets to generate alternating magnetic fields to magnetically drive (rotate) the external rotor. The minimum value of M1 ($M1|_{min.}$) may be 9 ($M1|_{min.}$=3 (the number of motor's phases)×3 (the minimum number of coils for each phase). Typically, M1 may be: 9, 12, 15 and so on. (Preferably, M1=9.)

In some embodiments the eccentric drive assembly may be concentrically, structurally and adjacently 'sandwiched' between the two bearings. That is, the first (distal) bearing may be interposed between the diaphragm pump assembly, or, more specifically, between the eccentric drive assembly, and the external rotor, while the other (distal) bearing supports the opposite/remote end of the drive shaft.

In some embodiments, both the eccentric drive assembly and the external rotor may be interposed between the two bearings. The external rotor may be interposed between the first bearing and the diaphragm pump assembly or the eccentric drive assembly, and the eccentric drive assembly may be interposed between the second bearing and the external rotor. In some of these embodiments the first bearing and the external rotor may partly or completely overlap (e.g., the first bearing may partly or completely concentrically reside in the external rotor).

In some embodiments the diaphragm pump may further include a second electric motor that may include an inner stator and an external rotor that may concentrically house or contain the inner stator. In these embodiments, the second end (of the rotor shaft may be connected to the external rotor of the second electric motor to auxiliary rotate (together with the external rotor of the first electric motor) the rotor shaft about the motor axis. (The motor axis may be common also to the inner stator and to the external rotor of the second electric motor.) In some of these embodiments the eccentric drive assembly may be concentrically, structurally and adjacently sandwiched between the two bearings, such that each bearing may be interposed between the eccentric drive assembly and a respective electric motor. In other embodiments the eccentric drive assembly may be concentrically, structurally and adjacently sandwiched between the two electric motors, e.g., sandwiched by their external rotors, such that each external rotor may be interposed between the eccentric drive assembly and a respective bearing.

In some configurations, one of the two bearings and the respective external rotor may partly or completely concentrically overlap (e.g., the bearing may partly or completely concentrically reside in the respective external rotor), while the other bearing may be completely external to its respective external rotor. In other configurations, each of the bearings may partly or completely concentrically reside in, or longitudinally partly or completely overlap, the respective external rotors. The external rotor of the first electric motor and the external rotor of the second electric motor may be concentrically positioned on (to drive) the rotor shaft in a 'back-to-back' configuration, such that an open side of one external rotor and an open side of the other external rotor face to opposite directions, away from each other.

Similarly to the external rotor of the first electric motor, the external rotor of the second electric motor may also include a non-magnetic cylindrical part, which is open on one side and closed on the other side, and a number N2 of permanent magnets that may be mounted in/on the second electric motor, for example attached to, or embedded in, the non-magnetic cylindrical part of the second electric motor. (N2 may be equal to N1; preferably N1=N2=12.) Similarly to the N1 permanent magnets of the first external rotor, the N2 permanent magnets in or of the second external rotor (the external rotor of the second electric motor) may be angularly uniformly distributed, or evenly spaced apart in, or with respect to, for example, the circumference of the non-magnetic cylindrical part of the external rotor of the second electric motor. The external rotor of the second electric motor may include a non-magnetic ring shaped member to house, embed or contain the N2 permanent magnets.

The internal stator of the second electrical motor may include a number M2 of electromagnets to generate alternating magnetic fields to auxiliary drive (rotate) the external rotor. The minimum value of M2 ($M2|_{min.}$) may be nine ($M2|_{min.}$=3 (the number of motor's phases)×3 (the minimum number of coils for each phase). Typically, M2 may be: 9, 12, 15 and so on. (M2 may be equal to M1; preferably, M1=M2=9.)

BRIEF DESCRIPTION OF THE DRAWINGS

Various exemplary embodiments are illustrated in the accompanying figures with the intent that these examples not be restrictive. It will be appreciated that for simplicity and clarity of the illustration, elements shown in the figures referenced below are not necessarily drawn to scale. Also, where considered appropriate, reference numerals may be repeated among the figures to indicate like, corresponding or analogous elements. Of the accompanying figures:

FIG. 2 schematically illustrates a one-motor diaphragm pump configuration according to an example embodiment;

FIG. 3A schematically illustrates a one-motor diaphragm pump configuration according to another example embodiment;

FIG. 3B schematically illustrates a one-motor diaphragm pump configuration according to yet another example embodiment;

FIG. 4 schematically illustrates a two-motor diaphragm pump configuration according to another example embodiment;

FIG. 5A schematically illustrates a two-motor diaphragm pump configuration according to yet another example embodiment;

FIG. 5B schematically illustrates a two-motor diaphragm pump configuration according to yet another example embodiment;

FIG. 6A schematically illustrates a stator and a rotor of a motor according to an example embodiment;

DETAILED DESCRIPTION OF THE INVENTION

The description that follows provides various details of exemplary embodiments. However, this description is not intended to limit the scope of the claims but, instead, to explain various principles of the invention and the manner of practicing it.

In the following description, various aspects of the invention will be described. For purposes of explanation, specific configurations and details are set forth in order to provide a thorough understanding of the invention. However, it will also be apparent to one skilled in the art that the invention may be practiced without the specific details presented herein. Furthermore, well-known features may be omitted or simplified in order not to obscure the invention.

The diaphragm pump disclosed herein may typically include a pumping chamber, an eccentric drive assembly that drives (actuates) a diaphragm in the pumping chamber via a pump shaft, an electric motor whose drive shaft drives (actuates) the eccentric drive assembly, and two bearings—one on each side of the eccentric drive mechanism—to rotatably support the motor's drive shaft and, via the motor's drive shaft, also the eccentric drive mechanism. By positioning two bearings in the way described herein, the motor's drive shaft has no free end, hence no degree of freedom, which eliminates the bearing(s) wearing problem described above.

Figure 1A:
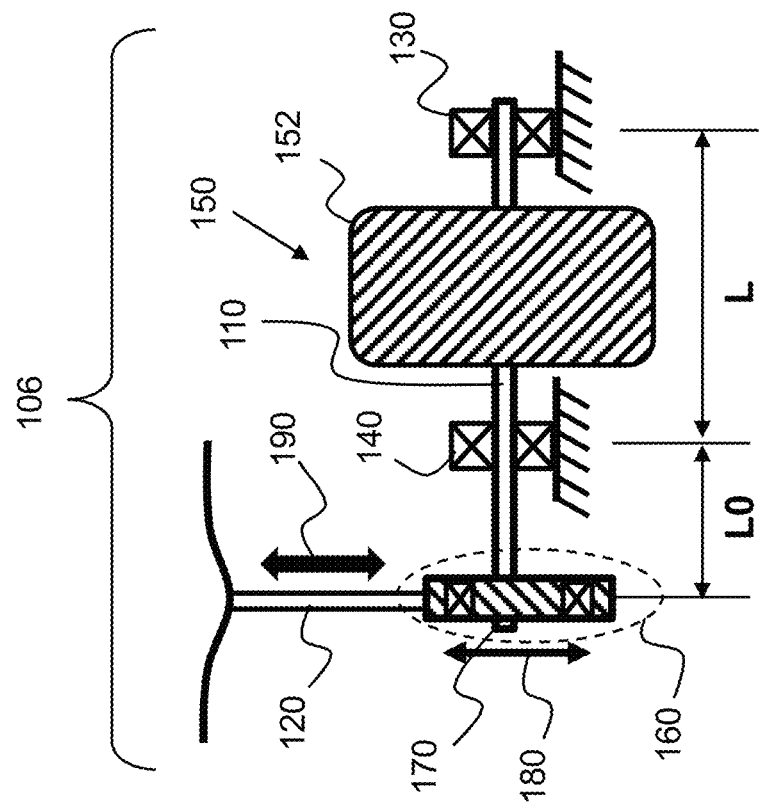
FIG. 1A (prior art) schematically illustrates a pumping principle of a diaphragm pump.
Figure 1B:
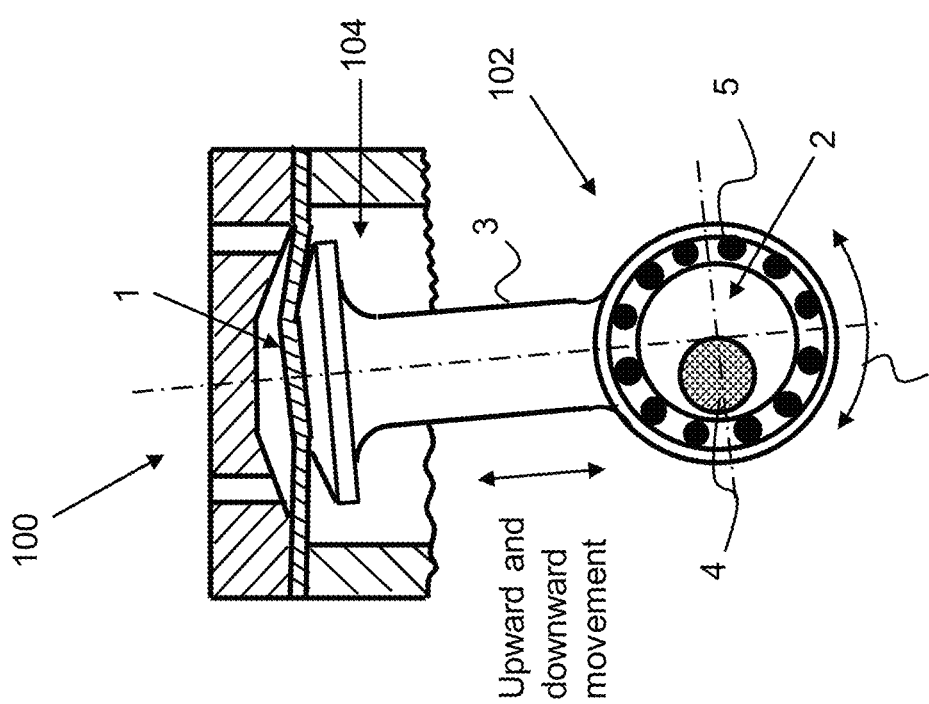
FIG. 1B (prior art) schematically illustrates a diaphragm pump that implements the pumping principle illustrated in FIG. 1A.
Figure 1C:
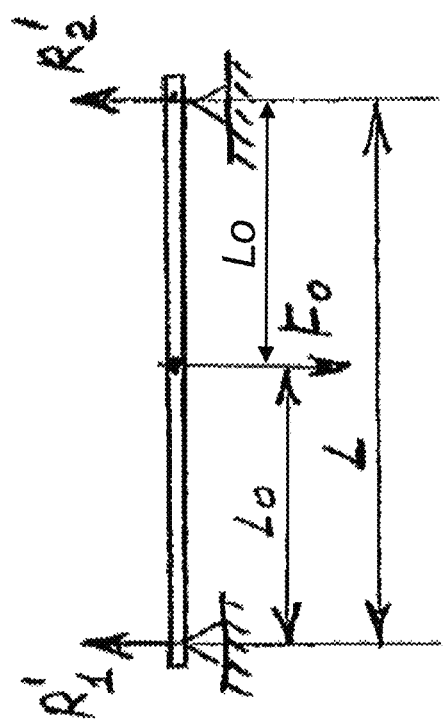
FIG. 1C (prior art) illustrates distribution of forces acting on motor's bearings during operation of a conventional diaphragm pump.

The diaphragm pump disclosed herein may have various configurations, all of which implement the principle that the eccentric drive assembly is interposed between two bearings, rather than being conventionally actuated by a free (bearing-free) end of a cantilever motor's drive shaft. Implementation of this principle helps counteracting the moments that result from the swinging motion imposed by the pump's eccentric drive assembly on the motor's drive shaft. Restraining, or mitigating, these moments in the way disclosed herein significantly reduces the resulting radial forces that the motor's shaft drive applies to the bearing nearest to the eccentric drive assembly, and thus extends the bearing's operating lifetime, hence the miniature pump's overall operation time, to more than 30,000 hours, compared with less than 10,000-20,000 hours of conventional small/miniature diaphragm pumps. Comparative analysis of the forces acting in FIG. 1C and FIG. 9 demonstrates that the operation time of the diaphragm pump subject of the present invention can be up to approximately twenty seven times longer than the operation time of a conventional diaphragm pump. (The comparative analysis is described below in connection with FIG. 9.)

In addition, the overall size of the diaphragm pump disclosed herein can be made very small thanks, among other things, to the fact that two bearings, rather than one, counteract the detrimental moment applied by the eccentric drive mechanism on the bearing nearest to the eccentric drive assembly (and therefore the size of each bearing can be reduced), and the electric motor driving the pumping chamber can be miniaturized because the smaller bearings have reduced weight and they produce lower friction, and, in addition, the electric motor subject of the invention includes a small external rotor that includes a thin layer of discrete permanent magnets, and the small external rotor contains an inner stator. The diaphragm pump disclosed herein is coupling free, which has many advantages, for example, in terms of size, weight, friction, power consumption, etc. The electric motor, though small, produces a relatively high maximal vacuum/pressure (e.g., approximately 250-300 mBar).

FIG. 2 schematically illustrates a coupling-free diaphragm pump 200 according to an example embodiment of the present invention. Coupling-free diaphragm pump 200 may include an electric motor 210 and a diaphragm pump assembly 220. Electric motor 210 may include an inner stator 230, with stator body 232, and an external rotor 240 that concentrically houses or contains inner stator 230.

Coupling-free diaphragm pump 200, or electric motor 210, may also include a rotor shaft 250 that has a first (proximal) end 252, which is connected to external rotor 240, and a second (distal) end 254 that is opposite first (proximal) end 252. (The terms 'proximal' and 'distal' are used herein to denote locations that are respectively close to and distant from the external rotor.) Rotor shaft 250 may be configured to be driven by external rotor 240 to rotate about a motor axis 260 that may be common to rotor shaft 250, to inner stator 230 and to external rotor 240.

Coupling-free diaphragm pump 200 may also include a first (proximal) bearing 272 to rotatably support first (proximal) end 252 of rotor shaft 250, and a second (distal) bearing 274 to rotatably support second (distal) end 254 of rotor shaft 250.

Diaphragm pump assembly 220 may include a pumping chamber 280 that may include, among other things (e.g., in addition to a fluid inlet port and a fluid output port) a diaphragm 282. Diaphragm pump assembly 220 may also include an eccentric drive assembly 290 that may be reciprocally actuated by rotor shaft 250 to actuate, or drive, diaphragm 282, via a pump shaft 292, along a pump driving axis 284 of pumping chamber 280. Eccentric drive assembly 290 may be concentrically, structurally and adjacently interposed between (sandwiched by) first (proximal) bearing 272 and second (distal) bearing 274.

External rotor 240 may include a non-magnetic cylindrical part 242 and a number N1 of permanent magnets that are schematically shown at 244. Cylindrical part 242 may have a recess or cavity for housing or containing inner stator 230. The permanent magnets may be mounted on, attached to, or embedded in, non-magnetic cylindrical part 242. External rotor 240 may be made of a plastic or metallic material. The N1 permanent magnets may be angularly uniformly distributed, or evenly spaced apart in, or with respect to a circumference of non-magnetic cylindrical part 242 of external rotor 240. The value of N1 may be a multiple of 3 (e.g., 3, 6, 9, 12, 15, and so on).

Figure 6C:
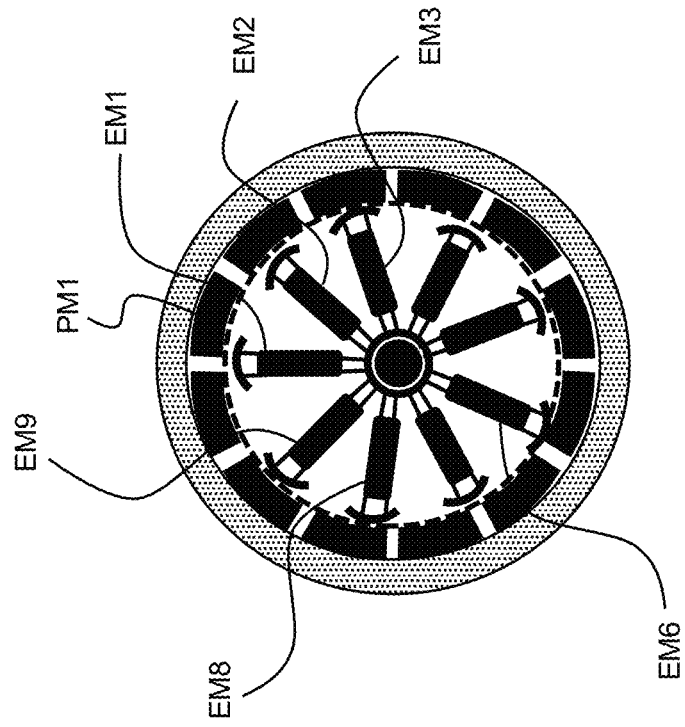
FIG. 6C schematically illustrates a cross-section of the stator of FIG. 6A.
Figure 6B:
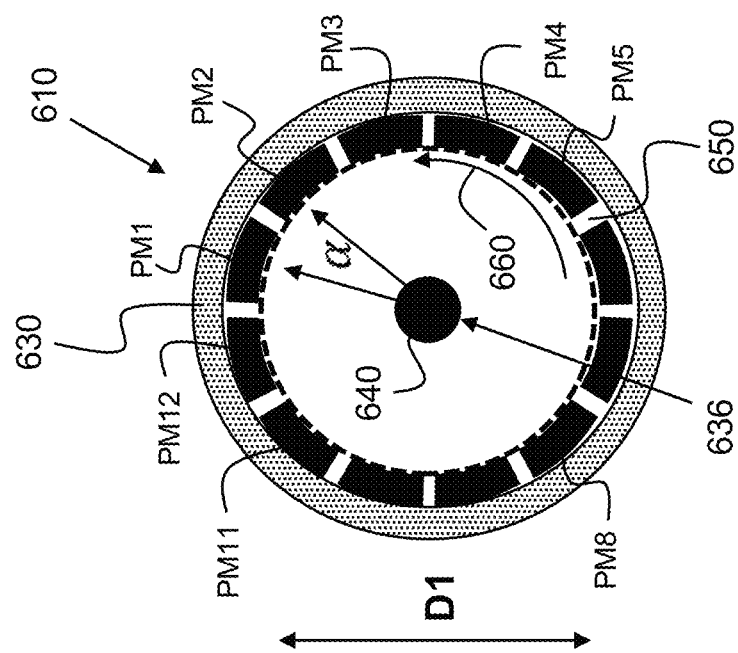
FIG. 6B schematically illustrates a cross-section of the rotor of FIG. 6A.
Figure 7A:
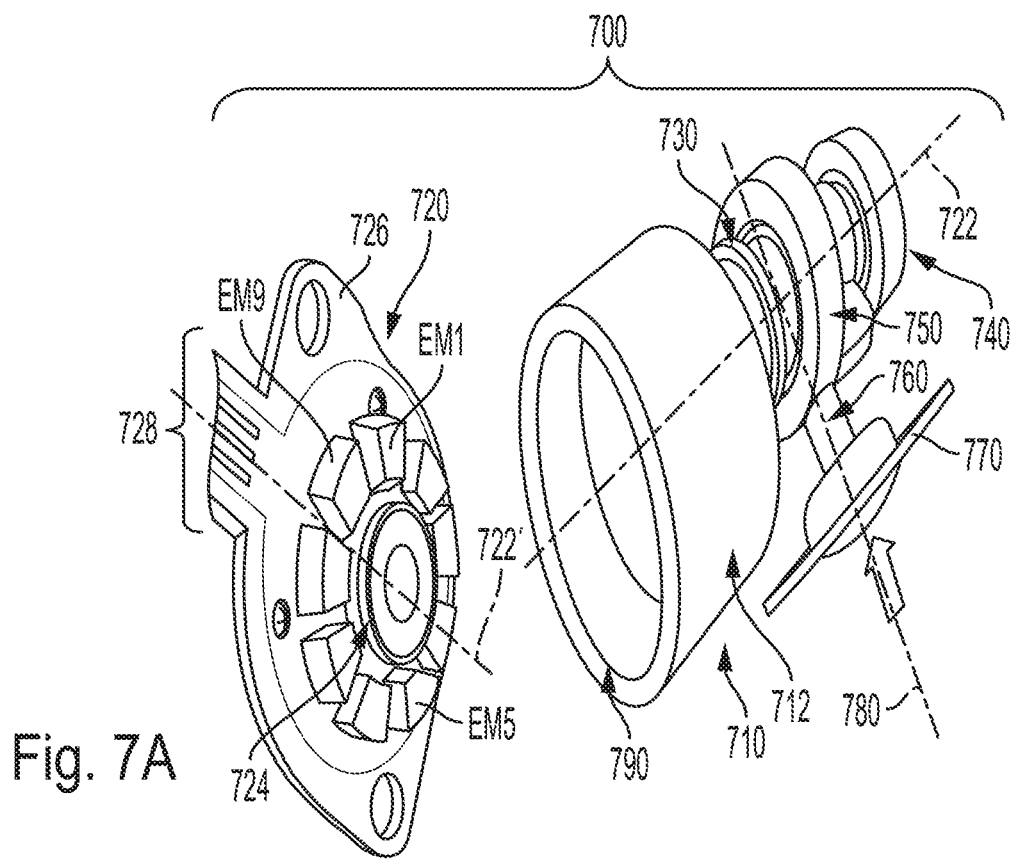
FIG. 7A depicts a motor (disassembled) according to an example embodiment.

Coupling-free diaphragm pump 200, or electric motor 210, may also include a non-magnetic (for example plastic) ring shaped member (the ring shaped member is shown more clearly at 650 in FIG. 6B, and at 790 in FIG. 7A). The non-magnetic ring shaped member, which may be made of, for example, plastic, may house the N1 permanent magnets. The ring shaped member may, for example, be concentrically attached or affixed to the cylindrical inner surface 246 of cylindrical part 242 such that the ring axis and the motor axis (260) coincide. Internal stator 230 may include a number M1 of electromagnets (not shown in FIG. 2) to magnetically generate, in conjunction with the N1 permanent magnets, a magnetic force that drives (rotates) rotor shaft 250. That is, the M1 electromagnets may be controllably operated (e.g., electrical currents be controllably provided to their coils) such that an interaction between the magnetic field(s) generated by the electromagnets and the permanent magnetic fields of the permanent magnets creates a magnetic force that causes the external rotor to rotate in a desired, or predetermined, direction (e.g., clockwise, counter clockwise) and/or speed (rounds per minute, r.p.m.).

In the configuration shown in FIG. 2, first bearing 272 is interposed between diaphragm pump assembly 220 and external rotor 240. (Different example configurations are shown in FIGS. 3A-3B, 4, 5A-5C, which are described below.) Since diaphragm pump assembly 220 is interposed between two bearings (e.g., bearing 272 and bearing 274), which is also the case in the other configurations disclosed herein, the radial forces acting on each bearing (e.g., on bearing 272) due to the moment applied by eccentric drive assembly 290 are, by far, less than the radial forces acting on bearing 140 (FIG. 1B) as a result of the moment that a similar eccentric drive device applies on bearing 140 of FIG. 1B.

Since electric motor 210 includes an external rotor (240) that concentrically houses or contains an inner stator (230), the width (W1) of the electric motor can be made very small, thus enabling the entire length (L1) of diaphragm pump 200 to be very small as well, to enable miniaturizing diaphragm pump 200 to make it suitable for low-capacity pumping applications.

FIG. 3A schematically illustrates a coupling-free diaphragm pump 300 according to another example embodiment of the present invention. In the configuration shown in FIG. 3A, the electric motor is 'fully' interposed between a first bearing and a diaphragm pump assembly. (In the configuration of FIG. 3A, none of the two bearings is contained, even partly, in the motor's external rotor.)

Coupling-free diaphragm pump 300 may include an electric motor 310, which may be similar to electric motor 210 of FIG. 2, and the diaphragm pump assembly 220 of FIG. 2, though other diaphragm pumping assemblies may likewise be used. Electric motor 310 may include an inner stator that may be identical or similar to inner stator 230, and an external rotor 340 that may be identical or similar to external rotor 240, and may have a recess or cavity for concentrically housing or containing the inner stator. (For simplicity, electric motor 310 is shown in FIG. 3A without the inner stator.)

Coupling-free diaphragm pump 300, or electric motor 310, may also include a rotor shaft 350 that has a first end 352, which is connected to external rotor 340, and a second end 354 that is opposite first end 352. Rotor shaft 350 may be configured to be driven by external rotor 340 to rotate about a motor axis 360 that is common to rotor shaft 350, to the motor's inner stator, and to external rotor 340.

Coupling-free diaphragm pump 300 may also include a first bearing 372 to rotatably support first end 352 of rotor shaft 350, and a second bearing 374 to rotatably support second end 354 of rotor shaft 350. Like the configuration of FIG. 2, diaphragm pump assembly 220 is also interposed, in FIG. 3A, between two bearings (e.g., first bearing 372 and second bearing 374). As in FIG. 2, bearings 372 and 374 maintain the lengthwise axis, or rotation axis, of rotor shaft 350 in place while rotor shaft 350 rotates in them.

In the configuration shown in FIG. 3A, the electric motor (electric motor 310) is interposed between one of the two bearings (e.g., first bearing 372) and the eccentric drive assembly (290) (of diaphragm pump assembly 220), and the eccentric drive assembly is interposed between the electric motor and the other bearing (e.g., second bearing 374). Since the eccentric drive assembly 290 is also interposed, in FIG. 3A, between two bearings (e.g., bearing 372 and bearing 374), the moment applied by eccentric drive assembly 290 on each bearing are, by far, less than the moment applied by a similar eccentric drive device on a single bearing (e.g., bearing 140, FIG. 1B).

As in the configuration of FIG. 2, the width of the electric motor (310) can be very small, thus enabling the entire length (L2) of diaphragm pump 300 to be very small as well, thus enabling miniaturization of diaphragm pump 300 to make it suitable for low-capacity pumping applications.

FIG. 3B schematically illustrates a coupling-free diaphragm pump 380 according to another example embodiment of the present invention. As in the other configurations described herein and shown in the respective figures, the eccentric drive assembly (eccentric drive assembly 290) shown in FIG. 3B may be interposed between two bearings (bearings 384 and 386). In addition, in the configuration shown in FIG. 3B the electric motor (382) is interposed between first bearing 384 and eccentric drive assembly 290, but first bearing 384 may concentrically partly (but it can completely) reside in, or longitudinally partly (but it can completely) overlap the motor's external rotor (388). External rotor 388 may have a recess or cavity for accommodating (housing or containing) the inner stator. Inserting first bearing 384, completely or partly, into the electric motor (e.g., into the external rotor or into the inner stator) enables reducing the overall length (L3) of the pumping system along motor axis 390.

FIG. 4 schematically illustrates a coupling-free diaphragm pump 400 according to another example embodiment of the present invention. Diaphragm pump 400 may be actuated by two identical or similar electric motors (motors 210 and 410) that may be mounted back-to-back (e.g., back 420 of rotor 240 to back 430 of external rotor 440) and symmetrically with respect to eccentric drive assembly 290. External rotor 440 may have a recess or cavity for accommodating (housing or containing) the inner stator. (Electric motors 210 and 410 may be of the same or similar type, or of different types.)

A difference between the pump configuration of FIG. 2 (for example) and the pump configuration of FIG. 4 is that, in addition to first electric motor 210, diaphragm pump 400 also includes a second electric motor 410. First electric motor 210 and second electric motor 410 may respectively include external rotors 240 and 440. External rotors 240 and 440 may each concentrically house an inner stator similar to inner stator 230 of FIG. 2. (The concentric inner stators housed by the external rotors of FIG. 4 are not shown in FIG. 4 for simplicity.)

While first end 252 of rotor shaft 250 may be connected to, to be driven by, external rotor 240, second end 254 of rotor shaft 250 may be connected to the external rotor 440 of second electric motor 410 to auxiliary rotate rotor shaft 250 about motor axis 260. Motor axis 260 may be common to both electric motors 210 and 410 (that is, common to their stators and rotors).

As in the other configurations described herein and shown in the respective figures, the eccentric drive assembly (eccentric drive assembly 290) shown in FIG. 4 is also interposed between two bearings (bearings 272 and 274). In addition, in the configuration shown in FIG. 4 bearings 272 and 274 are respectively interposed between electric motors 210 and 410 and eccentric drive assembly 290. (Each bearing (272,274) is interposed between eccentric drive assembly 290 and a respective electric motor (210,410)). In the configuration of FIG. 4, electric motors 210 and 410 are mounted back-to-back; that is, back side 420 of electric motor 210 and back side 430 of electric motor 410 face each other (their 'open' sides 422 and 432 face away from each another). In FIG. 4, the two bearings (272,274) sandwich eccentric drive assembly 290, and each electric motor is connected (via its external rotor) to one of the motor shaft's ends: electric motor 210 is connected (via external rotor 240) to motor shaft end 252, and electric motor 410 is connected (via external rotor 440) to motor shaft end 254.

FIG. 5A schematically illustrates a coupling-free diaphragm pump 500 according to another example embodiment of the present invention. Diaphragm pump 500 includes two electric motors 510 and 520 that respectively include external rotors 514 and 524, and internal stators that are not shown in FIG. 5A. Diaphragm pump 500 may be actuated by the two electric motors (510,520) that, like in the configuration of FIG. 4, may also be mounted back-to-back and symmetrically with respect to eccentric drive assembly 290. Electric motors 510 and 520 rotate rotor shaft 550 about motor axis 560, and rotor shaft 550, while rotating, actuates, or drives, diaphragm 282, via pump shaft 292, along pump driving axis 284 of pumping chamber 280. Each electric motor (510,520), or each external rotor (514,524), may be interposed between eccentric drive assembly 290 of diaphragm pump assembly 220 and a respective bearing (512, 522).

Figure 5C:
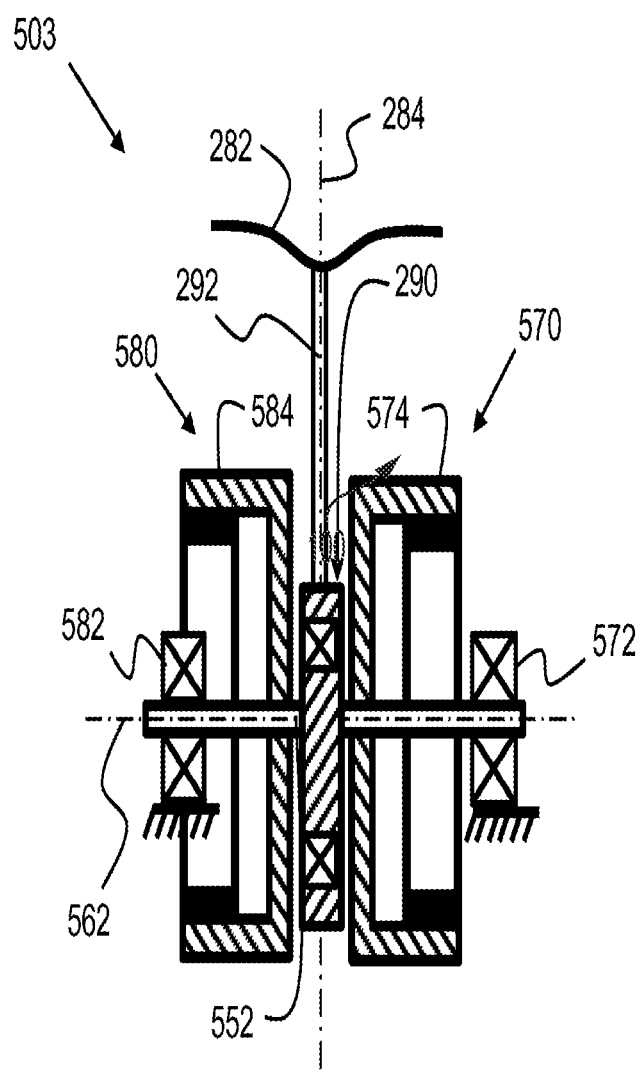
FIG. 5C schematically illustrates a two-motor diaphragm pump configuration according to yet another example embodiment.

As in the other configurations described herein and shown in the respective figures, the eccentric drive assembly (eccentric drive assembly 290) shown in FIG. 5A is also interposed between two bearings (bearings 512 and 522). Electric motors 510 and 520 in FIG. 5A are also mounted back-to-back and symmetrically with respect to eccentric drive assembly 290. According to other embodiments, two bearings (per, for example, FIG. 5B) or one bearing (per, for example, FIG. 5C) can be concentrically partly or completely housed by, or incorporated or reside in the electric motors (e.g., in the external rotor, or in the inner stator). (At least one of the two bearings (512,522) may partly or completely concentrically reside in or longitudinally overlap with the respective external rotor (514,524)). Electric motors 510 and 520 concentrically, structurally and adjacently sandwich eccentric drive assembly 290, and each bearing rotatably supports one of the ends of the motor shaft (the drive shaft is common to both motors): bearing 512 rotatably supports motor shaft end 592, and bearing 522 rotatably supports motor shaft end 594.

FIG. 5B schematically illustrates a coupling-free diaphragm pump 501 according to another example embodiment of the present invention. Diaphragm pump 501 may include two electric motors 511 and 521 that may respectively include external rotors 515 and 525, and, in addition, concentric internal stators, which are not shown in FIG. 5B. Diaphragm pump 501 may be actuated by the two electric motors (511,521) that, like in the configurations of FIGS. 4 and 5A, are also mounted back-to-back and symmetrically with respect to eccentric drive assembly 290. Electric motors 511 and 521 rotate rotor shaft 551 about motor axis 561, and rotor shaft 551, while rotating, actuates, or drives, diaphragm 282, via pump shaft 292, along pump driving axis 284 of the pumping chamber. In the configuration of FIG. 5B, both bearings partly reside in, or housed by, the electric motors: bearing 513 partly resides in, or housed by, electric motor 511, and bearing 523 partly resides in, or housed by, electric motor 521. Each of electrical motors 511 and 521 (each of external rotors 515 and 525) is interposed between eccentric drive assembly 290 of the diaphragm pump assembly, and a respective bearing (513,523). As in FIG. 5A, the two electric motors (511,521) in FIG. 5B also concentrically, structurally and adjacently sandwich eccentric drive assembly 290, and each bearing rotatably supports one of the ends of the motor shaft, which is common to both motors: bearing 513 rotatably supports motor shaft end 515, and bearing 523 rotatably supports motor shaft end 517.

FIG. 5C schematically illustrates a coupling-free diaphragm pump 503 according to another example embodiment of the present invention. Diaphragm pump 503 includes two electric motors (570,580) that respectively include external rotors 574 and 584, and concentric internal stators that are not shown in FIG. 5C. Diaphragm pump 503 may be actuated by electric motors 570 and 580 that, as in the configurations of, for example FIGS. 4, 5A and 5B, are also mounted back-to-back and symmetrically with respect to eccentric drive assembly 290. Electric motors 570 and 580 rotate rotor shaft 552 about motor axis 562, and rotor shaft 552, while rotating, actuates, or drives, diaphragm 282, via pump shaft 292, along pump driving axis 284 of the related pumping chamber. In the configuration of FIG. 5C, only one bearing partly resides in, or housed by, an electric motor. For example, bearing 582 partly resides in, or housed by, electric motor 580. Each of electrical motors 570 and 580 (e.g., each of external rotors 574 and 584) may be interposed between eccentric drive assembly 290 of the diaphragm pump assembly, and a respective bearing (572,582). Eccentric drive assembly 290 may be interposed between the external rotor (574) of the first electrical motor (motor 570) and the external rotor (584) of the second electrical motor (motor 580).

FIG. 6A schematically illustrates a structure of an electric motor 600 according to an example embodiment. (The diaphragm pump disclosed herein may include one electric motor or more than one electric motor, which may be identical or similar to, for example, electric motor 600.) Electric motor 600 may include an external rotor 610 (cross-sectional shown) and an inner stator 620 that is insertable (602) into external rotor 610. (External rotor 610 and inner stator 620 are shown in FIG. 6 disassembled.) Electric motor 600 also includes a rotor shaft 640. Rotor shaft 640 is mechanically coupled (e.g., rigidly connected or attached) to external rotor 610, to rotate shaft 640 about a common lengthwise axis.

External rotor 610 may include a cylindrical part 630 that may be made of metal or include a non-magnetic material (e.g., plastic). A number N1 of permanent magnets ($PM_1$, $PM_2$, ..., $PM_{N1}$) may be mounted to (e.g., attached to, or embedded in) cylindrical part 630. By way of example, external rotor 610 includes twelve permanent magnets, though in FIG. 6A only seven of them (designated as 'PM1', 'PM2', ..., 'PM7') are illustratively shown. (The twelve permanent magnets, designated as PM1 through PM12, are shown in FIG. 6B.) Cylindrical part 630 may have an open side or base 632 and a closed side or base 634. Cylindrical part 630 may also have, between open side/base 632 and closed side/base 634, a recess or cavity 636. Recess/cavity 636 may accommodate or house, for example, the N1 permanent magnets ($PM_1$-$PM_{N1}$) and inner stator 620, and open side/base 632 has a diameter D1 that is greater than the peripheral diameter D2 of the electromagnets of inner stator 620, in order to enable insertion (602) of inner stator 620 into external rotor 610. The closed side (634) of cylindrical part 630 may be closed, for example, by any flat, non-magnetic (for example), material that can concentrically be fixedly connected to, to rotate, motor shaft 640. External rotor 610 may preferably be made of non-magnetic material, for example plastic or non-magnetic metal.

Inner stator 620 may include a number M of electromagnets ($EM_1$, $EM_2$, ..., $EM_M$, five of the M electromagnets, designated as $EM_1$, $EM_2$, ..., $EM_5$, are schematically shown in FIG. 6A). Each electromagnet includes a coiled electric wire. A circular external surface formed by the M electromagnets may have a diameter (D2) which is slightly smaller than the inner diameter D2 of external rotor 610. Inner stator 620 may also include a flange 624 for attaching inner stator 620, as a whole, to an object to which the bearings, which support rotor shaft 640, may also be attached. Inner stator 620 may also include an electrical wiring 670 for alternately activating and deactivating electromagnets $EM_1$, $EM_2$, ..., $EM_M$ electrically. An electrical driver (e.g., a controller) may controllably activate and deactivate electromagnets $EM_1$, $EM_2$, ..., $EM_M$ so as to obtain a desired rotation force/torque and/or a rotation speed (r.p.m.). Each external rotor in any of FIGS. 2, 3A-3B, 4, 5A-5C, 6A-6C and 7A-7B may have a recess or cavity for accommodating (housing or containing) the motor's inner stator.

FIG. 6B is a cross-sectional view of external rotor 610 of FIG. 6A along plane A-A. The N2 permanent magnets of external rotor 610 may be uniformly or evenly angularly distributed or spaced apart in, or with respect to the circumference of cylindrical part 630 of external rotor 610. For example, permanent magnets $PM_1$ and $PM_2$ are angularly spaced a degrees, and the same angle (a) may exist between any two adjacent permanent magnets. External rotor 610 may include a ring shaped member 650 having a ring axis that may coincide with the rotation axis of rotor shaft 640. The N1 permanent magnets may be mounted in or on (e.g., housed by or embedded in) ring shaped member 650. Ring shaped member 650 may be fixedly concentrically attached to the inner surface 638 (FIG. 6A) of cylindrical part 630, so as to ensure that the rotating magnetic force (which results from the magnetic interaction between the permanent magnetic fields generated by external rotor 610 and the alternating magnetic fields generated by the electromagnets of stator 620) is fully applied to cylindrical part 630, hence to rotor shaft 640.

FIG. 6C (not drawn to scale) is a cross-sectional view of inner stator 620 of FIG. 6A along plane B-B. The electromagnets of inner stator 620 may be uniformly or evenly angularly distributed or spaced apart in or with respect to the circumference of cylindrical part 660 of inner stator 620 (FIG. 6A). For example, a same angle may exist between any two adjacent electromagnets.

The number and size of the permanent magnets, as well as the number and size of electromagnets, may be selected such that the permanent magnets ($PM_1$-$PM_{N1}$) generate magnetically distinguishable peripheral discrete magnetic fields, and also the electromagnets ($EM_1$-$EM_{M1}$) generate magnetically distinguishable peripheral discrete magnetic fields, though alternating and rotating magnetic fields. Generating discrete magnetic fields by the permanent magnets of the external rotor is beneficial because the discrete magnetic fields, in conjunction with the discrete electromagnetic fields generated by the electromagnets may magnetically produce rotational moment that is relatively stronger, for example comparing with a similar motor structure in which the external rotor includes a magnetic yoke that increases the magnitude of magnetic fields of the magnets. However, using a magnetic yoke magnetically eliminates (or at least distorts, or 'smoothens') the magnetic field 'gaps' between the discrete magnetic fields, by making them less discrete, and thus reduces the attraction and/or repelling magnetic forces between the permanent magnetic fields of the permanent magnets and the alternating magnetic fields of the electromagnets.

FIG. 7A depicts a disassembled diaphragm pump 700 according to an example embodiment. Diaphragm pump 700 may include an electrical motor that may include an external rotor 710 and an inner stator 720. Diaphragm pump 700 is implemented according to the configuration of FIG. 2, where the eccentric drive assembly (750) is concentrically, structurally and adjacently sandwiched by two bearings (e.g., bearings 730, 740).

The non-magnetic cylindrical part (712) of external rotor 710 may drive the eccentric drive assembly 750 via a rotor shaft (not shown in FIG. 7A) to which external rotor 710 may be connected. The rotor shaft may be rotatably supported by two bearings; e.g., by a proximal bearing 730 and a distal bearing 740, and each of the two bearings may be positioned on one side of eccentric drive assembly 750, a bearing on each side thereof. Eccentric drive assembly 750 may be configured to move diaphragm 770 in a back-and-forth motion along pump axis 780. The rotor shaft connected to external rotor 710 may rotate about a rotation axis 722. (The non-magnetic ring shaped member embedding the N permanent magnets is shown at 790 as a black ring).

Figure 7B:
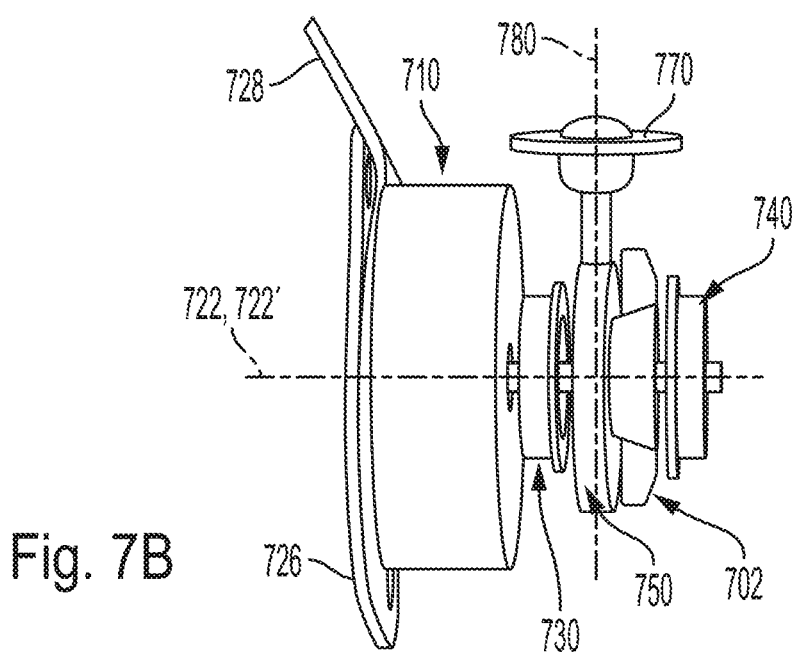
FIG. 7B depicts the motor of FIG. 7A after assembling the rotor and stator.

Stator 720 may include a stator body 724 on which a number M1 of electromagnet coils may be peripherally mounted. By way of example, nine electromagnets, designated as $EM_1$, $EM_2$, ..., $EM_9$, are mounted on stator body 724. Stator 720 may include a flange 726 by which the stator body (and the stator as a whole) may be fixedly attached to another object. Stator lengthwise axis 722' and rotor axis 722 may coincide after the two parts are assembled. Electrical wiring 728 is connected to the electromagnets for controlling the magnitude and polarity of the magnetic fields to be generated by the M electromagnets. FIG. 7B depicts the motor of FIG. 7A after the assembly of rotor 710 and stator 720 of FIG. 7A. A counterweight member 702 may be interpose between bearing 740 and eccentric drive assembly 750 in order to reduce vibrations.

Figure 8:
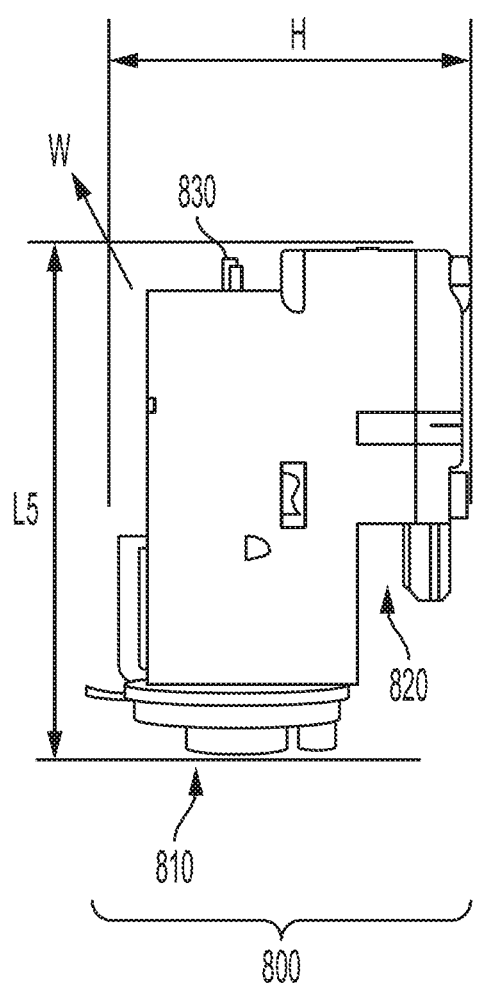
FIG. 8 depicts the diaphragm pump, including the motor, housed together according to an example embodiment.

FIG. 8 depicts a fully assembled diaphragm pump 800 according to an example embodiment. Diaphragm pump 800 includes an electric motor 810 and a pumping chamber 820. Part of the rotor shaft of the electric motor 810 is shown at 830. As explained above, using two, very small, bearings (compared with conventional one or more robust bearings) in the ways exemplified herein and in the figures, and a small external magnetic rotor that contains an inner electric stator enables miniaturizing the diaphragm pump while increasing its efficacy noticeably (compared with conventional compact diaphragm pumps) and extending its overall operation time to more than 30,000-40,000 hours, compared with less than 20,000 hours of conventional compact diaphragm pumps. For example, a diaphragm pump according to the present invention may be as small as 30 mm(L5)×25 mm(H)×15 mm(W).

Figure 9:
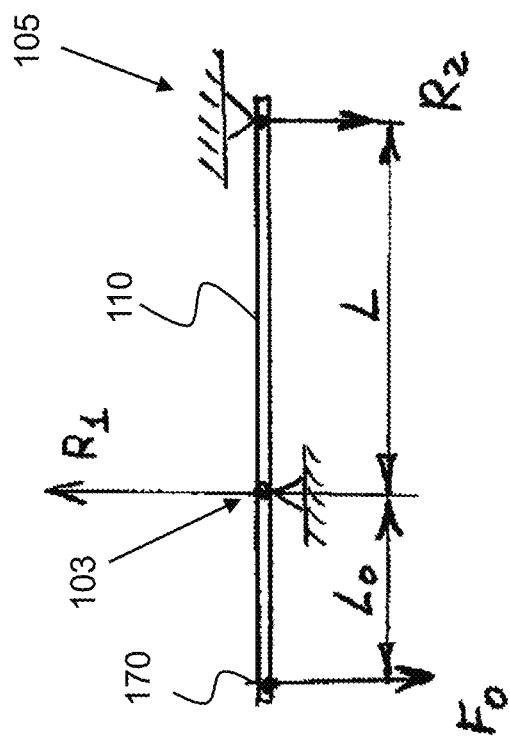
FIG. 9 illustrates distribution of forces acting on motor's bearings during operation of a diaphragm pump according to the present invention.

FIG. 9 illustrates distribution of forces acting on motor's bearings during operation of a diaphragm pump according to an example embodiment. Referring to FIG. 9, Fo is a force applied by a diaphragm push rod (e.g., rod 292, FIG. 2) in the middle of a cantilever shaft of the diaphragm pump (e.g., shaft 250, FIG. 2).

$R_1'$ and $R_2'$ are counteracting forces acting at the bearings, which are distanced away from the diaphragm the same distance Lo. Given the symmetry of the matter at hand (both bearings are distanced the same distance (Lo) from the diaphragm), the relationship between the two counteracting forces $R1'$ and $R2'$ and the force F0 are expressed by equation (6):

$$R'_1 = R'_2 = 0.5 F_0 \qquad (6)$$

Comparing equation (5) for the conventional pump setup and (6) for the new pump setup for the first bearing, the ratio between the respective counteracting forces may be estimated using equation (7):

$$R_1/R'_1 = 3 \qquad (7)$$

The effect the forces $R_1$ and $R'_1$ have on the operation time ($\tau$) of ball-bearings, which are typically used in such pumps, is expressed in equation (8):

$$\tau'_1/\tau_1 = (R_1/R'_1)^3 \qquad (8)$$

From (7) and (8) it is concluded that the operation time $\tau'_1$ of the ball-bearings in the new pump setup is twenty seven times longer than the operation time $\tau_1$ of the ball-bearings in conventional pump setup, as shown in equation (9):

$$\tau'_1 = \tau_1 * 27 \qquad (9)$$

Therefore, the operation time of a pump having a 'central load' configuration is up to twenty seven times longer than the typical operation time of a pump having a "cantilever" configuration, assuming that the operation time of the pump is dictated primarily by the bearings weariness.

Using a two-motor pump configuration, as illustrated, for example, in FIG. 4 and in FIGS. 5A-5C, may result in a non-uniform (e.g., throbbing or pulsating) rotational force acting on the common drive shaft (e.g., shaft 250, FIG. 4) if the two rotors have the same number of permanent magnets (PMs) and the two stators have the same number of electromagnets (EMs), and, in addition, the PMs of the two rotors are positioned in the same angular position with respect to one another (both rotors are connected to a same shaft), and the EMs of the two stators are also positioned in the same angular position with respect to one another (both stators are mounted to a same object).

During operation of the two motors, the minimum rotational moment in each of the two motor occurs when the rotor's PMs are angularly positioned in-between two of the stator's EMs, and the maximum rotational moment in each motor occurs when rotor's PMs, after some rotation, are 'optimally' aligned with the stator's EMs. (Each motor produces a rotational moment that is proportional to the alignment between its PMs and EMs. The more the motor's PMs and EMs are aligned, the greater the rotational moment that the motor produces.)

During operation of each motor, its PMs and EMs are subjected to an "alignment cycle", which is a cycle including an optimal alignment between its PMs and the EMs, which results in maximum rotation force, then 'reduced' alignment between them, which results in a weaker rotational force, then 'increased' alignment between them, which results in increased rotational force, then realignment between them, which, again, results in maximum rotational force, and so on and so forth.

Since both motors are subjected to the same alignment cycle, the combined, inharmonious, rotation moments applied by the two motors on the common shaft may cause the shaft to rotate in a non-uniform (e.g., throbbing or pulsating) rotational motion if both the PMs and EMs of the two rotors are not positioned properly; e.g., if they are 'mistuned'. Non-uniform rotational motion of the shaft is problematic because the flow rate of the fluid output by the pump would be unstable, and even uncontrollable. In order to solve the problem, the PMs of the rotors and the EMs of the stators are circumferentially positioned in the rotors and stators in a 'complimentary position' such that, when the PMs of one motor produce (in conjunction with the motor's EMs) maximum rotational moment on the shaft, the PMs of the other motor (which drives the same shaft) produces (in conjunction with the EMs of that motor) minimum rotational moment on the shaft. By using the complementary PMs and EMs positioning scheme described herein and illustrated in FIGS. 10A, 10B and 10C, the net rotational force acting on the shaft is, to a high extent, uniform; that is, the shaft rotates more smoothly.

One way to smoothen the rotational motion of the shaft is to angularly position (displace) the PMs of one rotor at a 'displacement' angle δ1 relative or with respect to the angular position or orientation of the PMs of the other rotor, where angle δ1 is half an angle β1 between each two adjacent PMs in each rotor. (Assuming that the two rotors have the same number of PMs.) For example, for a rotor of each motor that includes twelve PMs (M1=12), an angle β1 between each two adjacent PMs in each rotor is β1=360/12=30°. Therefore, structurally displacing (angularly orienting) the PMs of one rotor by/at an angle of 15° (δ1)=β1/2=30/2=15° relative to the PMs of the other rotor would result in the shaft rotating in a relatively uniform rotational motion. (The smaller the mass of the rotor and shaft and the greater the rotation-resisting force applied by the pump diaphragm, the more the rotor is prone to non-uniform rotational motion.)

Figure 10A:
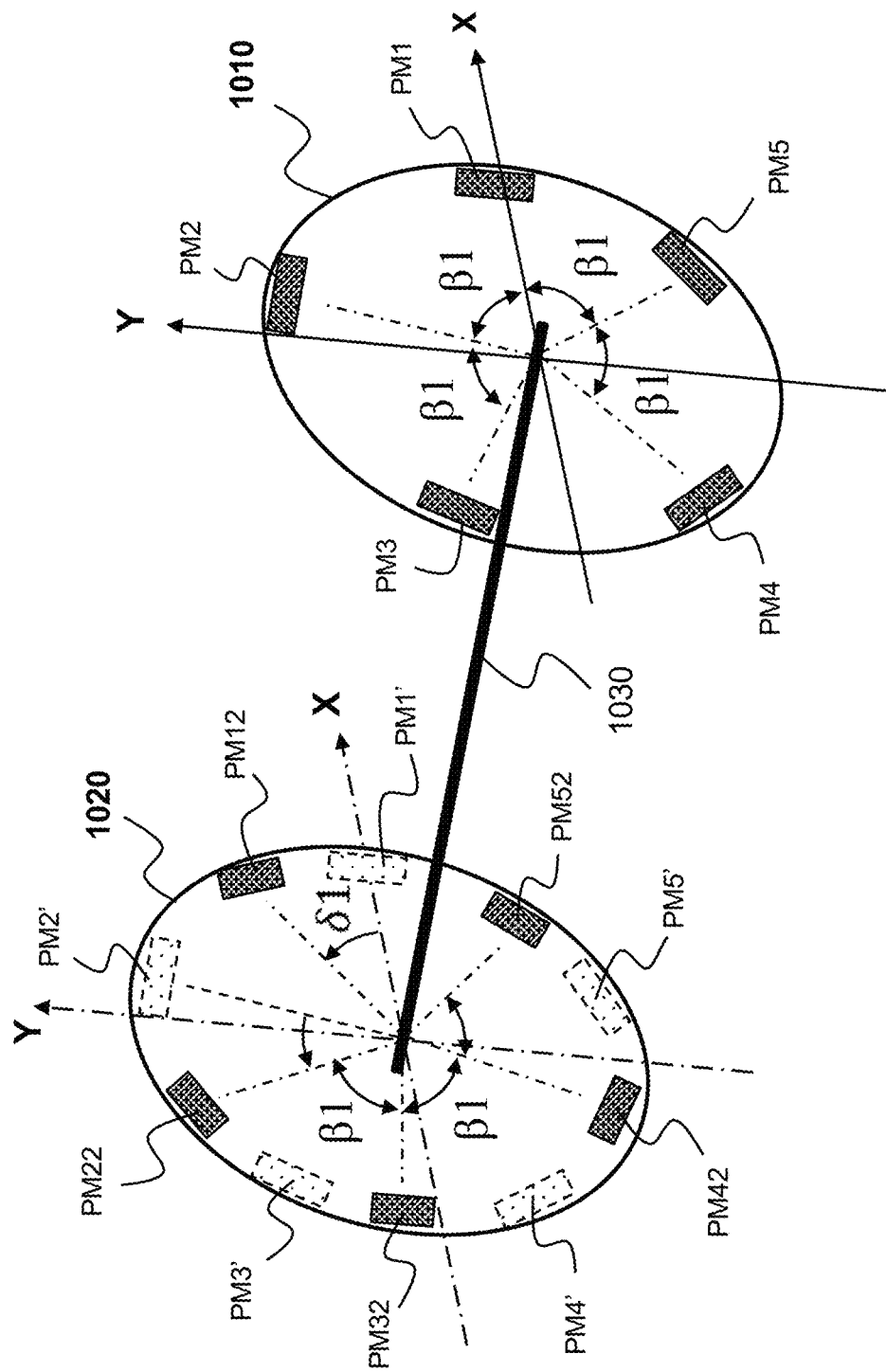
FIGS. 10A-10C schematically illustrate a solution to a PMs and EMs alignment problem associated with a two-motor configuration.

FIG. 10A schematically illustrates a solution to an alignment problem associated with the relative angular orientation of the PMs of the two-motor configuration, according to one example embodiment of the invention. A first rotor 1010 includes, for simplicity and ease of understanding, five PMs, designated as PM1, PM2, PM3, PM4 and PM5, and a second rotor 1020 that also includes five PMs, designated as PM12, PM22, PM32, PM42 and PM52. The angle β1 between each two adjacent PMs of rotors 1010 and 1020 is, therefore, 72° (360°/5). Rotors 1010 and 1020 are fixedly connected to a drive shaft 1030 such that they are stationary (immobilized) relative to one another; that is, the two rotors and the shaft rotate together, en masse. Therefore, once the angular orientations of the PMs of each rotor is structurally set, the structural relationship between the PMs of the two rotors are maintained also in operation.

For ease of reference, the angular position or orientation of the PMs of rotor 1010 is defined such that PM1 (an example reference magnet) lies on the X axis of the X-Y coordinate system, with the PMs evenly spaced apart circumferentially. As described above, angularly positioning or orienting the PMs of the other rotor (e.g., rotor 1020) in the same angular position or orientation as magnets PM1-PM5 of rotor 1010 (as shown at PM1', PM2', PM3', PM4' and PM5') would result in a non-uniform (a throbbing or pulsating) rotational moment, assuming that the EMs of the two stators also have the same angular orientation. However, angularly displacing the magnets PM12, PM22, PM32, PM42 and PM52 of rotor 1020 by an angle δ1 (a displacement angle of the permanent magnets) that is half the angle β1 solves that problem. (While the orientation of magnets PM1', PM2', PM3', PM4' and PM5' causes the alignment, or throbbing/pulsating, problem described above, the orientation of magnets PM12, PM22, PM32, PM42 and PM52, which is displaced by an angle δ1 relative or with respect to the orientation of magnets PM1, PM2, PM3, PM4 and PM5 solves that problem.)

Figure 10B:
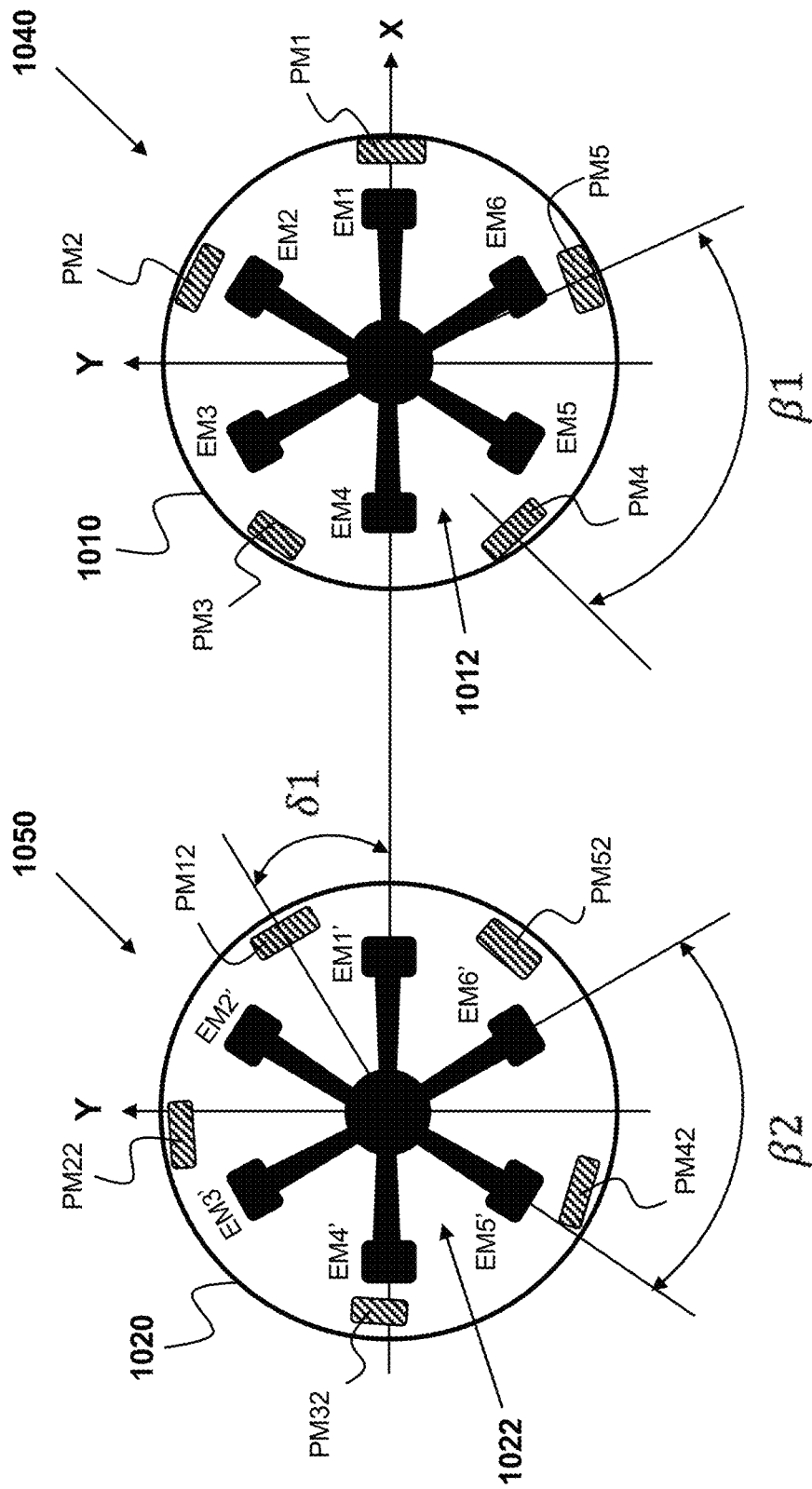

FIG. 10B shows the two motors 1040 and 1050 at operation time t0 according to an example embodiment. Motor 1040 includes rotor 1010 of FIG. 10A and a stator 1012. Motor 1050 includes rotor 1020 of FIG. 10A and a stator 1022. For simplicity and ease of understanding, each of stators 1012 and 1022 includes only six EMs, respectively designated as EM1, EM2, EM3, EM4, EM5 and EM6, and EM1', EM2', EM3', EM4', EM5' and EM6'. (As in FIG. 10A, rotors 1010 and 1020 in FIG. 10B are connected to the same shaft (1030), though the shaft is not shown in FIG. 10B.)

According to this embodiment, the EMs of the two stators have the same angular orientation or position with respect to the X-Y coordinate system. That is, there is no angular displacement between electromagnets EM1, EM2, EM3, EM4, EM5 and EM6 of stator 1010, and electromagnets EM1', EM2', EM3', EM4', EM5' and EM6' of stator 1020. For example, electromagnets EM1 and EM1' have the same angle (in this example zero degrees relative to the X axis), electromagnets EM2 and EM2' also have the same angle (in this example 360/6=30 degrees), and so on. However, as described in connection with FIG. 10A, the two rotors have different angular orientation with respect to the X-Y coordinate system, therefore with respect to one another. (The PMs of rotor 1020 are displaced an angle δ1 relative or with respect to the PMs of rotor 1010: magnets PM12, PM22, PM32, PM42 and PM52 of rotor 1020 are, respectively, angularly displaced or oriented an angle δ1 relative or with respect to magnets PM1, PM2, PM3, PM4 and PM5 of rotor 1010. For example, magnet PM12 structurally 'precedes' (is at an angle ahead of) magnet PM1 by angle δ1. Similarly, magnet PM22 structurally precedes magnet PM2 by the same angle, and so on. (The displacement angle δ1, once set structurally, does not change.) The PMs of each of rotors 1010 and 1020 are angularly and evenly spaced apart by an angle β1. The EMs of each of stators 1012 and 1022 are angularly and evenly spaced apart by an angle δ2.)

During operation (assume that rotors 1010 and 1020 rotate in counter clock direction), at time t0 magnet PM1 in rotor 1010 lies on the X axis, opposite electromagnet EM1 in stator 1012, and the corresponding PM (PM12) on rotor 1020 is positioned in-between electromagnets EM1' and EM2' in stator 1022. Therefore, the rotational force produced by PM1 and EM1 at time t0 is maximal, and the rotational force produced by PM1' is minimal. At the same time t0, magnet PM32 in rotor 1020 lies on the X axis, opposite electromagnet EM4' in stator 1022, and the corresponding PM (PM3) on rotor 1010 is positioned in-between electromagnets EM3 and EM4 in stator 1012. Therefore, the rotational force produced by PM32 and EM4' at time t0 is maximal, and the rotational force produced by PM3 is minimal. The result of this operation scheme is that, at time t0, PM1 of rotor 1010 and PM32 of rotor 1020 act together to rotate the shaft. The same principle applies to all the PMs and EMs of the two motors, because as the two rotors keep on spinning at the same angular speed, en masse, the maximum rotational forces acting on the shaft are shifted across the PMs and EMs of the two motors. Selecting the same odd number of PMs (e.g., 9) and the same even number of EMs (e.g., 12) for both motors result in a streamlined ('smoothened' or uniform) rotational motion of the shaft.

Another way to smoothen the rotational motion of the shaft is to structurally angularly displace or orient the static EMs of one stator at an angle δ2 (a displacement angle of the electromagnets) relative or with respect to the angular position or orientation of the static EMs of the other stator, where angle δ2 is half an angle β2 between each two adjacent EMs in each stator. (Assume that the two stators have the same number of EMs.) For example, for a stator of each motor that includes nine EMs (M1=9), an angle β2 between each two adjacent EMs is β2=360/9=40°. Therefore, structurally displacing (angularly orienting) the EMs of one stator by/at an angle of 20° (δ2)=β2/2=40/2=20° relative to the EMs of the other stator would also result in the shaft rotating in a uniform motion.

Figure 10C:
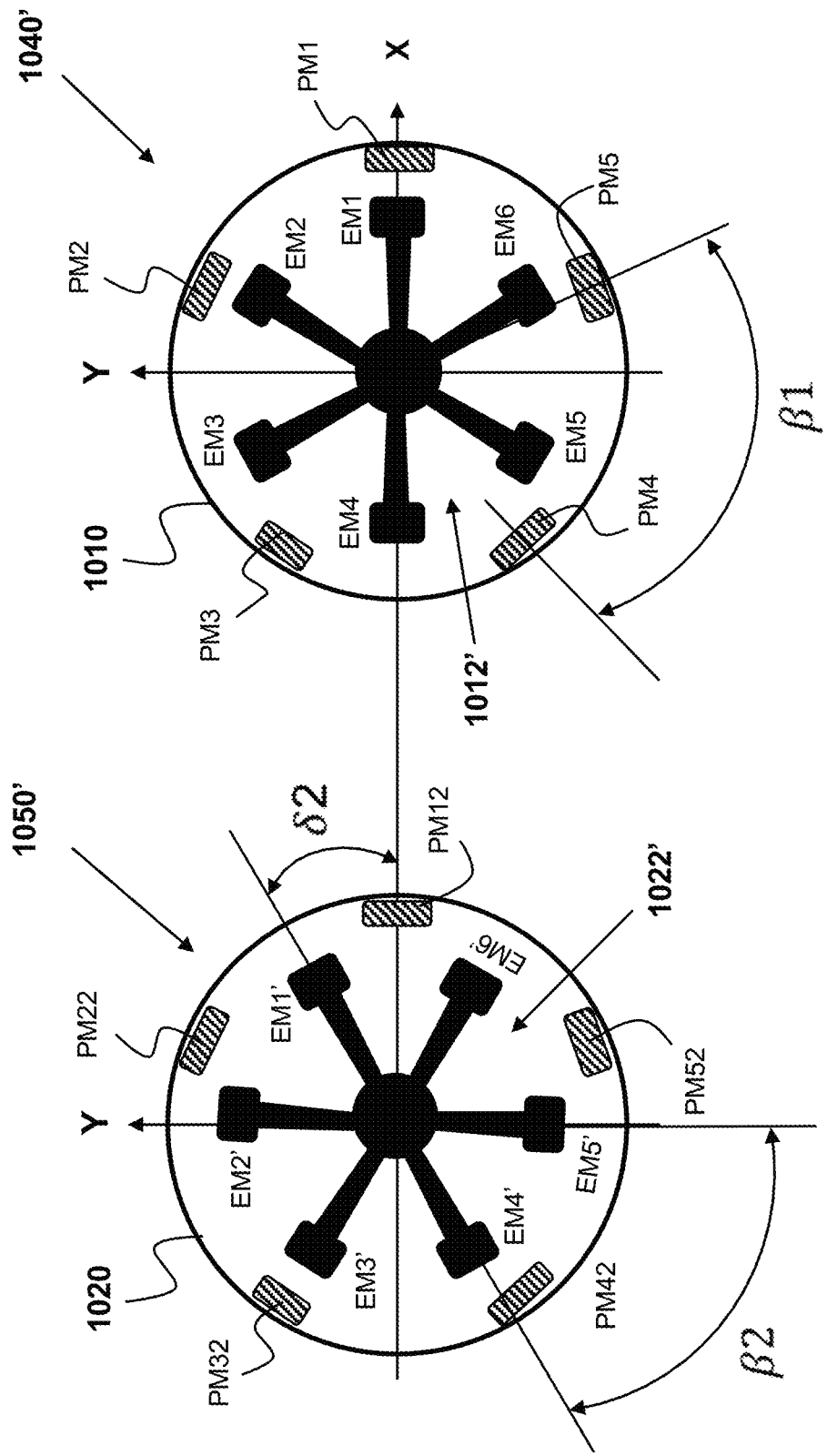

FIG. 10C shows the two motors 1040' and 1050' according to another example embodiment. In this embodiment, magnets PM1, PM2, PM3, PM4 and PM5 of rotor 1010 and magnets PM12, PM22, PM32, PM42 and PM52 of rotor 1020 have the same angular orientation (e.g., PM1 and PM12 have the same angle as they lie on the X axis; PM2 and PM22 have the same angle relative to the X axis, and so on). However, electromagnets EM1', EM2', EM3', EM4', EM5' and EM6' of stator 1022' are, respectively, angularly displaced relative or with respect to EM1, EM2, EM3, EM4, EM5 and EM6 of stator 1012' by an angle δ2. This embodiment, in which the EMs of one stator are structurally angularly displaced by a displacement angle (e.g., angle δ2) relative or with respect to the EMs of the other stator, has a similar result—in terms of the streamlined rotation of the shaft—as the embodiment in which the PMs of one rotor are structurally angularly displaced by a displacement angle (e.g., angle δ1) relative to the PMs of the other rotor. That is, the two solutions are equivalent.

Various aspects of the various embodiments disclosed herein are combinable with the other embodiments disclosed herein. Although portions of the discussion herein relate to one or two electric motors and to two bearings, embodiments of the invention are not limited in this regard.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A diaphragm pump comprising:
   a first electric motor comprising:
      an inner stator and an external rotor concentrically containing the inner stator;
      a rotor shaft having a first end connected to and driven by the external rotor, and a second end;
      a first bearing disposed on the first end and configured to rotatably support the first end of the rotor shaft wherein the first bearing partly resides in the external rotor;
      a second bearing disposed on the second end and configured to rotatably support the second end of the rotor shaft;
   a diaphragm pump assembly comprising:
      a pumping chamber comprising a diaphragm; and
      an eccentric drive assembly, the eccentric drive assembly interposed between the first bearing and the second bearing and configured to be actuated by the rotor shaft to drive the diaphragm;
   a second electric motor comprising:
      an inner stator and an external rotor concentrically housing the inner stator of the second electric motor,
      wherein the external rotor of the second electric motor is connected to the second end of the rotor shaft to auxiliary rotate the rotor shaft about the motor axis;
      wherein each of the external rotor of the first electric motor and the external rotor of the second electric motor comprises a number N of permanent magnets mounted on or in a cylindrical part;
      wherein each of the external rotor of the first electric motor and the external rotor of the second electric motor is structurally interposed between the eccentric drive assembly and the first bearing and the second bearing, respectively.

2. The diaphragm pump as in claim 1, wherein each of the first electric motor and the second electric motor further comprises a non-magnetic ring shaped member, the non-magnetic ring shaped member containing the related N permanent magnets.

3. The diaphragm pump as in claim 2, wherein the non-magnetic ring shaped member of each respective electric motor is concentrically attached to an inner surface of the related cylindrical part.

4. The diaphragm pump as in claim 2, wherein each external rotor and/or each non-magnetic ring shaped member is made of plastic or non-magnetic metal.

5. The diaphragm pump as in claim 1, wherein each of the internal stator of the first electric motor and the internal stator of the second electric motor comprises a number M of electromagnets.

6. The diaphragm pump as in claim 5, wherein the N permanent magnets of each rotor are circumferentially uniformly distributed or evenly spaced apart in the rotor by an angle β1, and wherein the M electromagnets of each stator are angularly uniformly distributed or evenly spaced apart by an angle β2.

7. The diaphragm pump as in claim 6, wherein N>M.

8. The diaphragm pump as in claim 6, wherein the N permanent magnets of the rotor of the first electric motor are angularly displaced by a displacement angle δ1 with respect to the N permanent magnets of the rotor of the second electric motor.

9. The diaphragm pump as in claim 6, wherein the M electromagnets of the stator of the first electric motor are angularly displaced by a displacement angle δ2 with respect to the M electromagnets of the rotor of the second electric motor.

10. The diaphragm pump as in claim 8, wherein $\delta1=\beta1/2$.

11. The diaphragm pump as in claim 1, wherein at least the second bearing partly resides in the external rotor of the second electric motor.

12. The diaphragm, pump as in claim 1, wherein the eccentric drive assembly is structurally interposed between the external rotor of the first electrical motor and the external rotor of the second electrical motor.

13. A diaphragm pump comprising: a first electric motor comprising:
      an inner stator and an external rotor concentrically containing the inner stator;
      a rotor shaft having a first end connected to and driven by the external rotor, and a second end;
      a first bearing disposed on the first end and configured to rotatably support the first end of the rotor shaft wherein the first bearing partly resides in the external rotor;
      a second bearing disposed on the second end and configured to rotatably support the second end of the rotor shaft;
   a second electric motor comprising:
      an inner stator and an external rotor concentrically housing the inner stator of the second electric motor,
      wherein the external rotor of the second electric motor is connected to the second end of the rotor shaft to auxiliary rotate the rotor shaft about the motor axis;
      wherein the external rotor of the first electric motor and the external rotor of the second electric motor are positioned on the rotor shaft in a 'back-to-back' configuration;
   a diaphragm pump assembly comprising:
      a pumping chamber comprising a diaphragm; and
      an eccentric drive assembly, the eccentric drive assembly interposed between the first bearing and the second bearing and configured to be actuated by the rotor shaft to drive the diaphragm.

14. The diaphragm pump according to claim 13, wherein each of the first electric motor and the second electric motor further comprises a non-magnetic ring shaped member, the non-magnetic ring shaped member containing the related N permanent magnets.

15. The diaphragm pump according to claim 14, wherein the non-magnetic ring shaped member of each respective electric motor is concentrically attached to an inner surface of the related cylindrical part.

16. The diaphragm pump according to claim 15, wherein each external rotor and/or each non-magnetic ring shaped member is made of plastic or non-magnetic metal.

17. The diaphragm pump according to claim 14, wherein each of the internal stator of the first electric motor and the internal stator of the second electric motor comprises a number M of electromagnets.

18. The diaphragm pump according to claim 17, wherein the N permanent magnets of each rotor are circumferentially uniformly distributed or evenly spaced apart in the rotor by an angle $\beta 1$, and wherein the M electromagnets of each stator are angularly uniformly distributed or evenly spaced apart by an angle $\beta 2$.

19. The diaphragm pump as in claim 18, wherein N>M.

20. The diaphragm pump as in claim 18, wherein the N permanent magnets of the rotor of the first electric motor are angularly displaced by a displacement angle $\delta 1$ with respect to the N permanent magnets of the rotor of the second electric motor.

21. The diaphragm pump as in claim 18, wherein the M electromagnets of the stator of the first electric motor are angularly displaced by a displacement angle $\delta 2$ with respect to the M electromagnets of the rotor of the second electric motor.

22. The diaphragm pump as in claim 20, wherein $\delta 1 = \beta 1/2$.

* * * * *